(12) United States Patent
Masoudi et al.

(10) Patent No.: US 11,846,226 B2
(45) Date of Patent: Dec. 19, 2023

(54) EXHAUST GAS MIXER, SYSTEM, AND METHOD OF USING

(71) Applicant: EMISSOL LLC, Mill Creek, WA (US)

(72) Inventors: Mansour Masoudi, Mill Creek, WA (US); Jacob Roy Hensel, Mill Creek, WA (US); Edward Benjamin Tegeler, IV, Mill Creek, WA (US); Nikolai Alex Poliakov, Mill Creek, WA (US)

(73) Assignee: Emissol, LLC, Mill Creek, WA (US)

( * ) Notice: Subject to any disclaimer, the term of this patent is extended or adjusted under 35 U.S.C. 154(b) by 0 days.

(21) Appl. No.: 17/764,124

(22) PCT Filed: Sep. 29, 2020

(86) PCT No.: PCT/US2020/053333
§ 371 (c)(1),
(2) Date: Mar. 25, 2022

(87) PCT Pub. No.: WO2021/062418
PCT Pub. Date: Apr. 1, 2021

(65) Prior Publication Data
US 2022/0403766 A1    Dec. 22, 2022

Related U.S. Application Data

(60) Provisional application No. 62/987,430, filed on Mar. 10, 2020, provisional application No. 62/907,650, (Continued)

(51) Int. Cl.
*F01N 3/28*    (2006.01)
*F01N 3/20*    (2006.01)

(52) U.S. Cl.
CPC ........ *F01N 3/2892* (2013.01); *F01N 3/2013* (2013.01); *F01N 3/2066* (2013.01);
(Continued)

(58) Field of Classification Search
CPC .... F01N 3/2013; F01N 3/2066; F01N 3/2892; F01N 2240/16; F01N 2240/20;
(Continued)

(56) References Cited

U.S. PATENT DOCUMENTS

| 4,427,418 A | 1/1984 | Kogiso et al. |
| 5,353,813 A | 10/1994 | Deevi et al. |

(Continued)

FOREIGN PATENT DOCUMENTS

| EP | 2796684 A1 * | 10/2014 | ............ B01F 15/066 |
| WO | 2019191528 A1 | 10/2019 | |

OTHER PUBLICATIONS

Written Opinion and International Search Report, PCT/US2020/053333, dated Dec. 31, 2020, 11 pages.

*Primary Examiner* — Audrey B. Walter
(74) *Attorney, Agent, or Firm* — Mark L. Cooper

(57) ABSTRACT

A segmented, heated urea mixer and an exhaust system to control NOx emission from combustion engines comprising a plurality of elements, at least one element independently heatable by an external power source to a temperature above a temperature of another element. A method of using the exhaust gas mixer and an exhaust gas mixer system further comprising a controller is also disclosed.

18 Claims, 13 Drawing Sheets

Related U.S. Application Data filed on Sep. 29, 2019, provisional application No. 62/907,651, filed on Sep. 29, 2019.

(52) U.S. Cl.
CPC ...... *F01N 2240/16* (2013.01); *F01N 2240/20* (2013.01); *F01N 2240/25* (2013.01); *F01N 2570/14* (2013.01); *F01N 2610/02* (2013.01); *F01N 2610/102* (2013.01); *F01N 2610/105* (2013.01)

(58) Field of Classification Search
CPC ............. F01N 2240/25; F01N 2570/14; F01N 2610/02; F01N 2610/102; F01N 2610/105
See application file for complete search history.

(56) References Cited

U.S. PATENT DOCUMENTS

| | | |
|---|---|---|
| 2005/0180905 A1 | 8/2005 | Cichanowicz |
| 2011/0000194 A1* | 1/2011 | Gonze ................ F01N 3/103 60/297 |
| 2012/0117946 A1* | 5/2012 | Gonze ................ F01N 3/22 60/297 |
| 2015/0315943 A1 | 11/2015 | Gschwind |

* cited by examiner

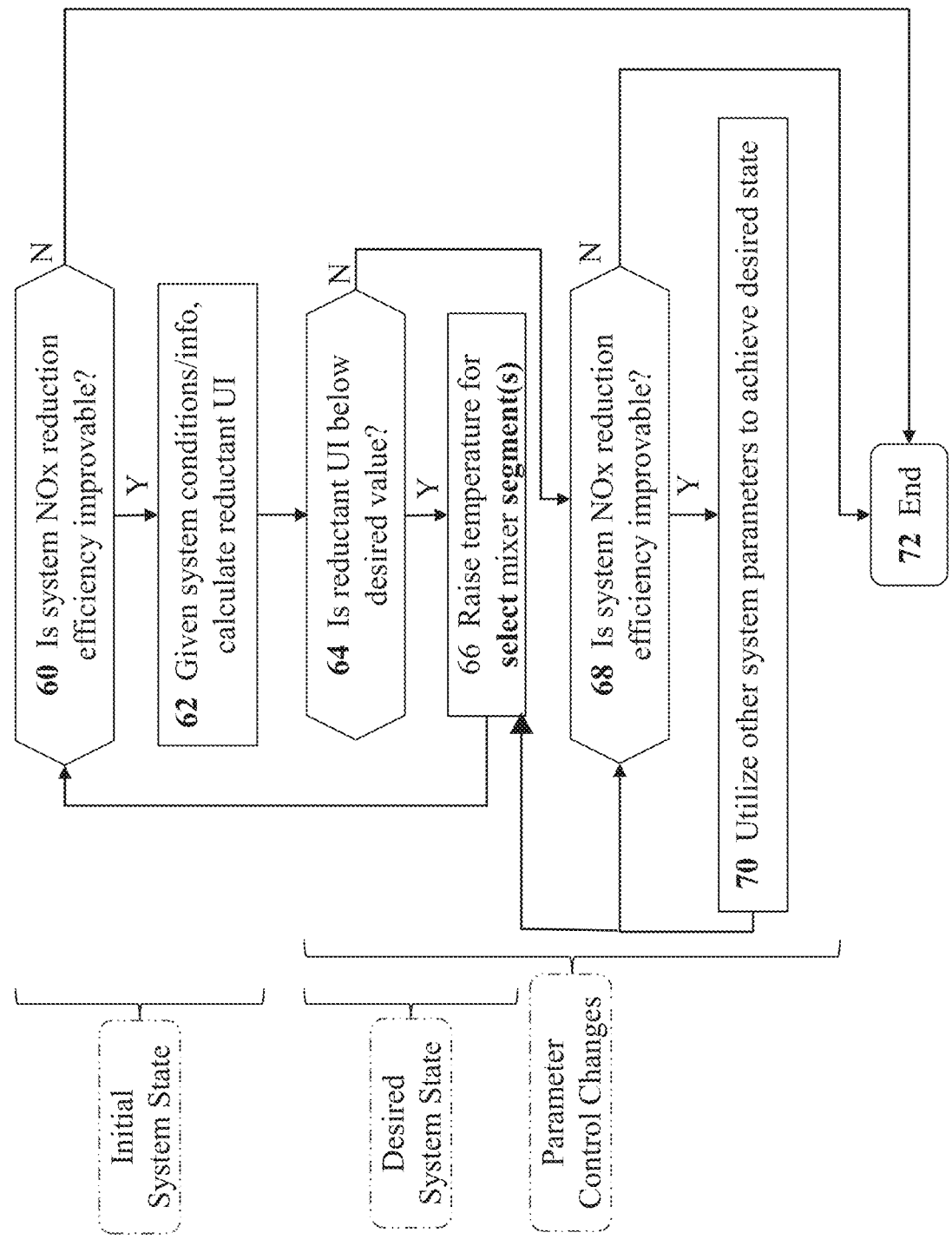

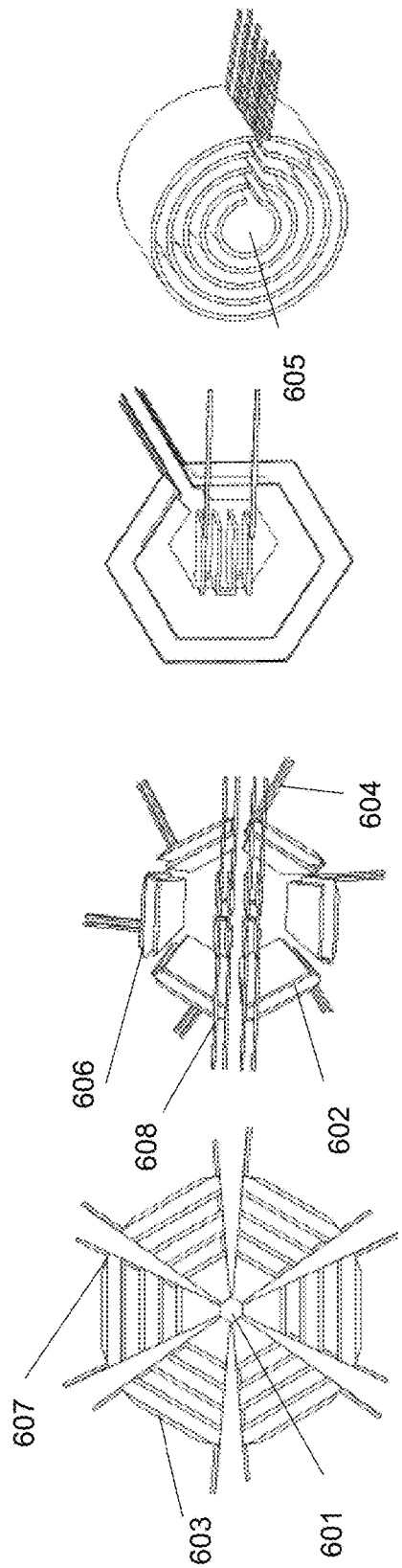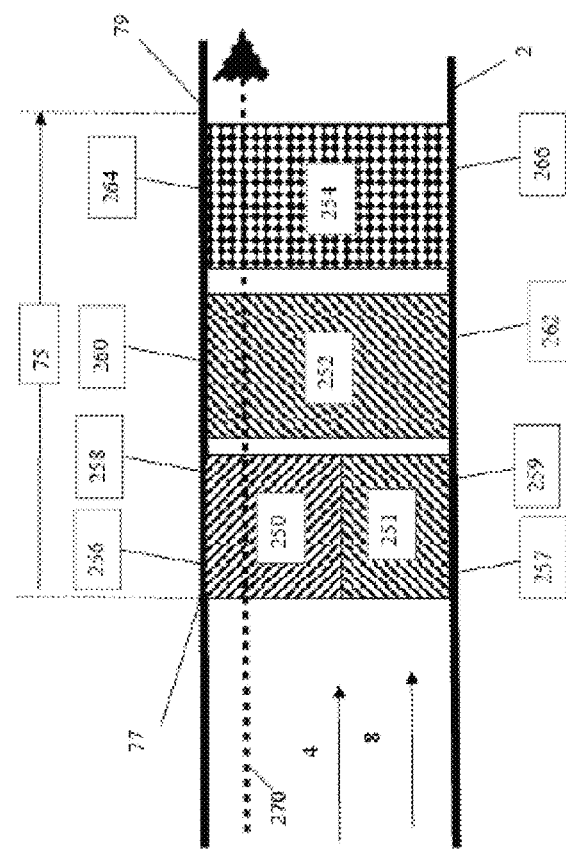

FIG. 14

Table 1

| Paramtr # | Name | Value | Value | Value | UI State | Uniformity Index (UI) |
|---|---|---|---|---|---|---|
| 1 | Engine-out NOx emission | Low | Mid | High | State 4 | UI 4 |
| 2 | Exhaust mass flow rate | Low | Mid | High | | UI 7 |
| 3 | Exhaust temperature | Low | Mid | High | | UI 6 |
| 4 | UWS injection rate, frequency, duty cycle | Low | Mid | High | | UI 10 |
| 5 | Exhaust Gas Recirculation (EGR) | Low | Mid | High | | UI 8 |
| 6 | Stored ammonia in catalyst | Low | Mid | High | State 3 | UI 3 |
| 7 | Mixer temperature distribution | Low | Mid | High | State 2 | UI 2 |
| 8 | Other parameters | Low | Mid | High | | UI 11 |
| UI State | ///////////// | UI State 1 | UI State 9 | ///// | ///// | ///////// |
| UI | ///////////// | UI 1 | UI 2 | UI 9 | ///// | ///////// |

EXHAUST GAS MIXER, SYSTEM, AND METHOD OF USING

RELATED APPLICATIONS

This application claims the benefit of a U.S. Provisional Application Ser. No. 62/987,430 filed Mar. 10, 2020, U.S. Provisional Application Ser. No. 62/907,650 filed Sep. 29, 2019, and U.S. Provisional Application Ser. No. 62/907,651 filed Sep. 29, 2019; the disclosures of which are incorporated by reference herein in their entirety.

STATEMENT OF GOVERNMENT SPONSORSHIP

The present invention was partly made with funding from the US National Science Foundation under grant No. 1831231. The US Government may have certain rights to this invention.

BACKGROUND

The statements in this section merely provide background information related to the present disclosure and may not constitute prior art.

Exhaust emissions require monitoring and are actively treated to minimize formation of nitrogen oxides, commonly referred to as NOR. One such treatment method includes providing a reductant, i.e., ammonia, within the exhaust gas stream followed by catalytic reduction of the NO by an SCR catalyst to form nitrogen and water. The ammonia needed for this catalytic reaction is provided by injecting a stream of aqueous urea into the exhaust gas stream, which thermally decomposes to form ammonia, ammonia precursors, and carbon dioxide. However, at lower temperatures this decomposition reaction does not take place at an appreciable rate. This is especially problematic in diesel exhaust, which is typically at a much lower temperature than the exhaust produced via an internal combustion engine powered by gasoline or other lite hydrocarbons.

There is a need to form ammonia from aqueous urea within an exhaust system in amounts suitable to convert NOx into nitrogen at lower exhaust gas temperatures.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure relates to a segmented, heated urea mixer system to control NOx emission from combustion engines. In embodiments an exhaust gas mixer comprises a plurality of elements disposed within a flowpath located between a mixer inlet through which an exhaust gas and a reductant flow into the exhaust gas mixer, and a mixer outlet through which the exhaust gas and the reductant flow out of the exhaust gas mixer, at least one of the elements being heatable by an external power source independent of another of the plurality of elements.

In a related embodiment, an exhaust gas mixer comprises a plurality of elements or segments disposed within a flowpath located between a mixer inlet through which an exhaust gas and a reductant flow into the exhaust gas mixer, and a mixer outlet through which the exhaust gas and the reductant flow out of the exhaust gas mixer, wherein at least one, or at least two, or each of the plurality of elements or segments are heatable by an external power source independent of the other elements.

In other embodiments, an exhaust gas system for treating an exhaust gas from an exhaust gas source, e.g., an internal combustion engine, comprises an exhaust gas mixer disposed within a conduit downstream of a urea water solution (UWS) injector system, and upstream of a selective catalytic reduction (SCR) catalyst, an electronic controller in electrical communication with at least one element of the mixer, and in electronic communication one or more sensors and/or control modules; the exhaust gas mixer comprising a plurality of elements disposed within a flowpath located between a mixer inlet through which the exhaust gas and a reductant flow into the exhaust gas mixer, and a mixer outlet through which the exhaust gas and the reductant flow out of the exhaust gas mixer, at least one of the elements being heatable by an external power source independent of another of the plurality of elements; wherein the controller is configured to direct power from the external power source to at least one of the elements to increase or decrease a temperature of the one or more elements independent of the other elements to optimize SCR catalytic reduction of NOx present in the exhaust gas flowing therethrough to nitrogen and water downstream of the SCR catalyst, based on one or more inputs from the one or more sensors and/or control modules.

In one or more embodiments, an exhaust gas system for treating an exhaust gas, from an exhaust gas source, comprises an exhaust gas mixer disposed within a conduit downstream of a urea water solution (UWS) injector system, and upstream of a selective catalytic reduction (SCR) catalyst, an electronic controller in electrical communication with at least one element of the mixer, and electronic communication with one or more sensors; the exhaust gas mixer comprising a plurality of elements disposed within a flowpath located between a mixer inlet through which the exhaust gas and a reductant flow into the exhaust gas mixer, and a mixer outlet through which the exhaust gas and the reductant flow out of the exhaust gas mixer, at least one of the elements being heatable by an external power source independent of another of the plurality of elements; wherein the controller is configured to direct power from the external power source to at least one of the elements to increase a temperature of the one or more elements independent of the other elements to optimize SCR catalytic reduction of NOx present in the exhaust gas flowing therethrough to nitrogen and water downstream of the SCR catalyst, based on one or more inputs from the one or more sensors.

In embodiments, a method comprises the steps of i) providing an exhaust gas system according to any one or combination of embodiments disclosed herein comprising an exhaust gas mixer according to any one or combination of embodiments disclosed herein, ii) directing an atomized urea water solution (i.e., droplets of the urea water solution) and an exhaust gas comprising an amount of NOx from the exhaust gas source therethrough; and iii) controlling a direction of power from the external power source to at least one of the elements to independently increase or decrease a temperature of at least one element to optimize SCR catalytic reduction of NOx present in the exhaust gas flowing therethrough to nitrogen and water downstream of the SCR catalyst, based on one or more inputs from the one or more sensors and/or control modules.

BRIEF DESCRIPTION OF THE DRAWINGS

The present invention is herein described, by way of example only, with reference to the accompanying drawings, wherein:

FIG. 5 is a simplified flowchart of the major process steps for an initial system state to a desired system state having a target reductant uniformity index (UI) using parameter control changes, according to an embodiment disclosed herein;

FIG. 6G depicts a segmented heated mixer comprising different profiled heatable elements according to embodiments disclosed herein;

FIG. 6H depicts a segmented heated mixer comprising different profiled heatable elements according to embodiments disclosed herein;

FIG. 6I depicts a segmented heated mixer comprising different profiled heatable elements according to embodiments disclosed herein;

FIG. 6J depicts a segmented heated mixer comprising plurality of circular heatable elements according to embodiments disclosed herein;

FIG. 7 depicts a segmented heated mixer with three segments oriented along the length of the exhaust pipe;

FIG. 14 depicts a parametric matrix study of exemplary UI states according to embodiments disclosed herein.

DETAILED DESCRIPTION

Figure 1:
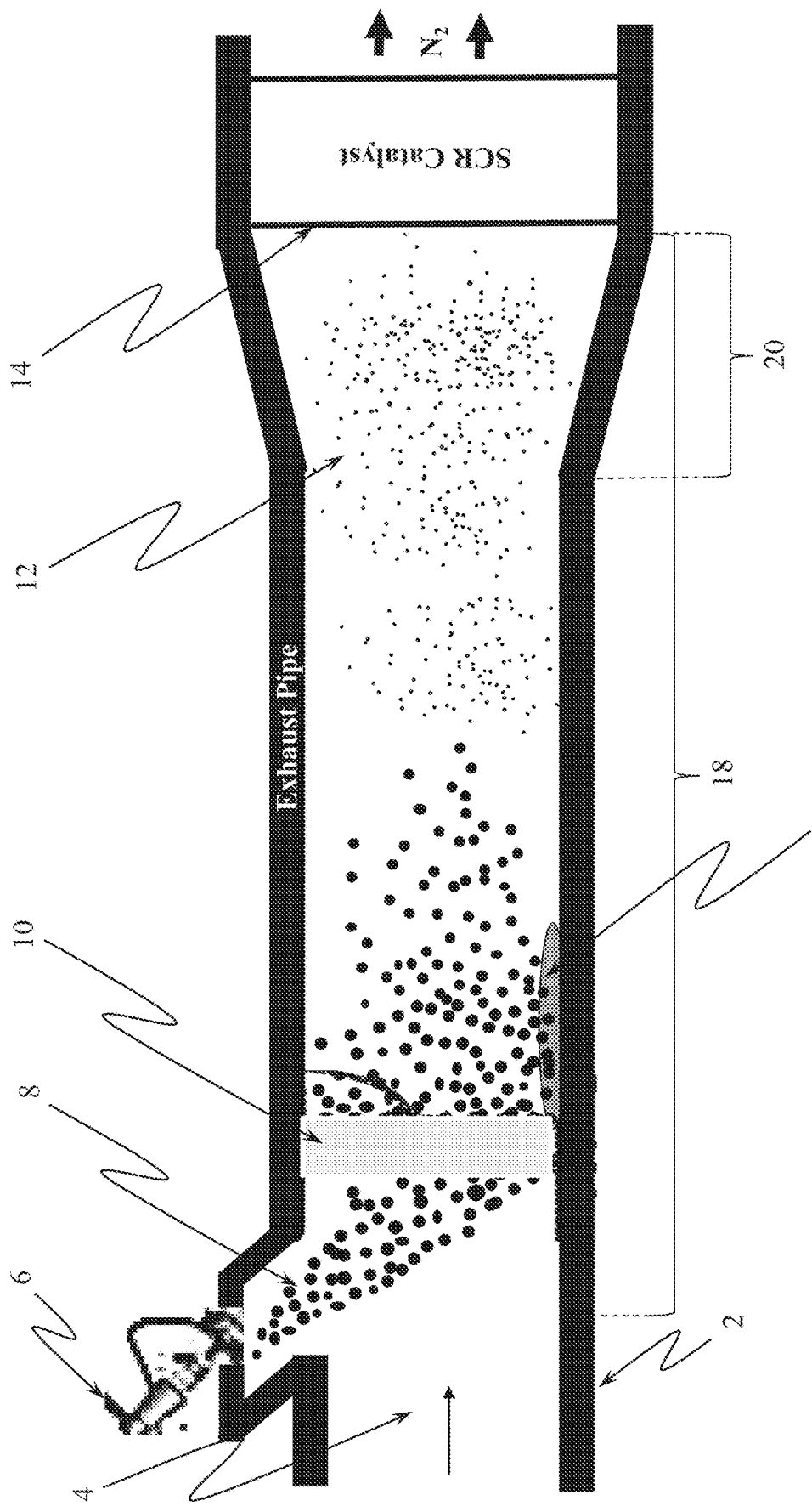
FIG. 1 is a simplified high-level schematic diagram depicting a cross-sectional representation of elements in a portion of a combustion-engine exhaust system having a urea decomposition pipe, according to the prior art.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the device, system and/or method used/disclosed herein can also comprise some components other than those cited.

In the summary and this detailed description, each numerical value should be read once as modified by the term "about" (unless already expressly so modified), and then read again as not so modified unless otherwise indicated in context. Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The following definitions are provided in order to aid those skilled in the art in understanding the detailed description. As used in the specification and claims, "near" is inclusive of "at." The term "and/or" refers to both the inclusive "and" case and the exclusive "or" case, and such term is used herein for brevity. For example, a composition comprising "A and/or B" may comprise A alone, B alone, or both A and B.

SCR refers to selective catalytic reduction catalysts according to the general understanding in the art. UWS refers to urea water solution suitable for use in forming the reductant utilized by selective reduction catalysts known in the art. The terms UWS, diesel exhaust fluid (DEF) and/or AdBlue are used interchangeably herein. Likewise, the terms ammonia and reductant are used interchangeably herein and include the other materials known to exist in such streams, as well as other technologies suitable for use herein, e.g., ammonia vapor. Further, the terms "mixer", "urea mixer", "UWS mixer" and the like could be used interchangeably without loss of generality or specificity.

For purposes herein, the treatment of exhaust gas via the reduction and control of nitrogen oxides (commonly written as NOx), from internal combustion engines and especially in diesel engines includes both on- or off-highway vehicles, passenger cars, marine vessels, stationary gensets, industrial plants, and the like. In addition, the present invention is useful for control of other species and/or in other types of engines and/or other types of processes as well.

As used herein, the terms "information," "signal," "input," "algorithm," and "data" may be used interchangeably or synonymously throughout the description.

Referring to the drawings, FIG. 1 is a simplified high-level schematic diagram depicting a cross-sectional representation of elements in a portion of a combustion-engine exhaust system having a urea decomposition pipe, according to the prior art. An exhaust pipe 2 having a longitudinal flow of exhaust gas 4 is shown with an integrated urea spray injector 6 for spraying a urea-water solution (UWS) in order to inject UWS droplets 8 into exhaust gas 4. A mixer 10 is positioned downstream of injector 6 for mixing UWS droplets 8 with exhaust gas 4. UWS (typically a mixture of about 30-40% urea and with the balance being water) is also known as DEF (diesel exhaust fluid) and/or AdBlue.

The Selective Catalytic Reduction (SCR) catalyst selectively reduces the regulated NOx species in the engine exhaust. To reduce the NOx in the engine exhaust, SCR needs gaseous ammonia, formed by injecting (atomizing) Diesel Exhaust Fluid (DEF) to form an atomized reductant of the urea-water solution. Heat in the exhaust gas evaporates the water present in the DEF spray droplets, forming gaseous ammonia ($NH_3$) in the exhaust, via the following reactions:

1. Droplets heat up, lose water content

2. Thermolysis: Urea converts into ammonia ($NH_3$), isocyanic acid (HNCO)

3. Hydrolysis: Isocyanic acid converts to $NH_3$

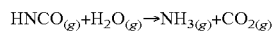

All three reactions rely on the thermal energy available in the exhaust gas heat to form ammonia and isocyanic acid (HNCO), the latter converting to ammonia usually on the catalyst inside the SCR to form ammonia, i.e., the 'reductants'. The reductant is paramount to operation of the Selective Catalytic Reduction (SCR) to reduce the regulated NOx species in engine exhaust.

However, the formation of the reductant from the injected UWS is difficult to achieve at relatively low exhaust temperatures, defined herein to be exhaust gas temperatures below about 200° C. Such conditions may exist under low-load engine operations such as in city driving, stop-and-go, low idle and the like. Accordingly, under such conditions the various control systems prohibit injection of the UWS.

The SCR catalyst and optimal conditions to form a uniform loading of the reductant by UWS injection have somewhat different temperature demands. While both perform well at higher exhaust gas temperatures, defined herein as being greater than or equal to about 250° C., the optimal temperatures for the SCR catalyst are in the range of about 250-350° C. As shown in FIG. 1, under lower exhaust gas temperatures below about 200° C., UWS droplets 8 can collect as liquid pools 16 on the relatively colder inner surfaces of exhaust pipe 2, and on other components such as the mixer, injector tip, the catalyst, and/or on other components or attachments nearby which lead to urea crystallizing and the formation of solid deposits. However, at these lower temperatures the SCR catalysts is capable of operation, wherein temperatures as low as 150° C. yield roughly about 50% NOx reduction efficiency, provided ammonia is provided to the catalyst.

As shown in FIG. 1, a urea "decomposition pipe length" 18 may be utilized to facilitate conversion of UWS droplets 8 into ammonia 12. However, curved sections of varying form which may be required to accommodate geometric spacing constraints and various other system limitations (shown as inlet cone 20 leading into the SCR catalyst 14) are known to negatively affect formation of the reductant as well as to result in poor distribution uniformity of UWS droplets 8 and/or in distribution uniformity of the subsequently formed ammonia 12 in the exhaust gas 4. Accordingly, a good uniform distribution of reductants in the exhaust gas increases NOx catalytic efficiency; and a poor-non-uniform (uneven) distribution reduces catalytic efficiency.

Applicants have discovered that the quality of reductant "distribution" at the SCR catalyst entrance, which is also referred to as reductant "uniformity" or the uniformity index, may be improved by utilizing a heated mixing element in which the injected urea evaporates into reducing species (reductants) upon its impingement on the urea mixer while travelling in the exhaust gas.

In addition, applicants have discovered that by utilizing a segmented mixer having a plurality of mixing elements wherein at least one of the mixing elements is heatable independent of the other mixing elements, the mixers achieve other benefits in addition to producing high reductant uniformity. Segmented heatable mixers according to embodiments disclosed herein have been found to further suppress and indeed, eliminate formation of troublesome urea deposits by keeping urea droplets away from the relatively-cooler exhaust pipe walls (typically the coolest spots in the exhaust system prone to forming urea deposits), or if needed, the heated mixers can be controlled to produce heat to raise the temperature of the exhaust gas which in-turn raises the temperature of the SCR catalyst to optimal levels under low temperature exhaust gas conditions.

Likewise, the use of a segmented heated mixer under low exhaust temperatures prevents both the formation of urea crystals and the resultant formation of high ammonia spikes as these crystals are converted to reductant under high temperature conditions, as well as addressing issues in which the mixer is continually 'cooled' due to urea droplets consistently impinging it, further reducing its temperature.

It is advantageous therefore to subject the UWS droplets impinging on the mixer to additional heating. This is especially beneficial in low temperature exhaust operations, where UWS droplets impinge on a 'cold' mixer elements, do not receive sufficient heat for heating and evaporation and result in droplets not evaporating rapidly, sufficient ammonia is not formed, and urea deposits form.

Accordingly, embodiments include an exhaust gas mixer, comprising a plurality of elements disposed within a flowpath located between a mixer inlet through which an exhaust gas and a reductant flow into the exhaust gas mixer, and a mixer outlet through which the exhaust gas and the reductant flow out of the exhaust gas mixer, at least one of the elements being heatable by an external power source independent of another of the plurality of elements, wherein two or more of the plurality of elements, or wherein each of the plurality of elements are independently heatable by the external power source.

In embodiments, at least one of the elements is heated using electrical resistance, microwave radiation, radiative heating, magnetic field inductive heating, thermal communication with an external heat source, piezoelectric heating, or a combination thereof. In embodiments, at least one of the elements is independently configured for resistance heating wherein an amount of electric current is directed through the element sufficient to increase the temperature of the element, independent of another element. In some embodiments, at least one element is dimensioned and arranged within the flowpath to disrupt a flow of the exhaust gas and the reductant flowing through the mixer. In some of such embodiments, one or more of the elements comprise one or more nozzles, flow diverters, fins, appendages, holes, cross sectional profiles, bends, twists, or a combination thereof.

In embodiments, the plurality of elements are arranged within the flowpath along a cartesian grid, a polar grid, a spherical grid, a toroidal grid, in a ladder type arrangement, in a plurality of arrays, rows, groups, or a combination thereof. Likewise, or in alternative embodiments, the plurality of elements are arranged within the flowpath such that no linear flowpath from the mixer inlet to the mixer outlet exists.

In embodiments, at least a portion of at least one element comprises one or more coating layers disposed on an electrically conductive substrate comprising a catalytically active material suitable to produce ammonia and/or an ammonia precursor from urea; a hydrophobic surface; a hydrophilic surface; a morphology which facilitates formation of reductant from droplets contacting the element; or a combination thereof, and/or at least a portion of a surface of at least one element comprises an RMS roughness of greater than or equal to about 50 microns; an RMS roughness of less than or equal to about 50 microns; a stippled morphology; a porous morphology; a saw-tooth profile; or any combination thereof.

In embodiments, at least one element comprises a first portion having a first electrical resistance; and a second portion having a second electrical resistance which is different than the first electrical resistance, such that when an electric current flows through the element, the first portion is heated to a higher temperature than the second portion. In some embodiments, at least one element comprises a main portion comprising the shortest electric flowpath between the power source and a ground (i.e., a direct circuit) such that the main portion is resistively heated to a first temperature when a sufficient amount of an electric current flows through the element, and one or more secondary portions which are arranged pendant to the main portion and which are resistively heated, if at all, to a second temperature below the first temperature when the same electric current flows through the element.

In embodiments, at least one element comprises a plurality of zones, wherein at least one zone comprises a different metal or metal alloy relative to another of the zones. In embodiments, the mixer and/or the at least one element may further comprise a metallic foam, a 3D-printed structure, an additive manufacture structure, or a combination thereof.

In embodiments, an exhaust gas system for treating an exhaust gas from an exhaust gas source, comprises: an exhaust gas mixer disposed within a conduit downstream of a urea water solution (UWS) injector system, and upstream of a selective catalytic reduction (SCR) catalyst, an electronic controller configured to direct power to at least one element of the mixer, and in electronic communication with one or more sensors or control modules; the exhaust gas mixer comprising a plurality of elements disposed within a flowpath located between a mixer inlet through which the exhaust gas and a reductant flow into the exhaust gas mixer, and a mixer outlet through which the exhaust gas and the reductant flow out of the exhaust gas mixer, at least one of the elements being heatable by an external power source independent of another of the plurality of elements; wherein the controller is configured to increase or decrease a temperature of the one or more elements independent of the other elements to optimize SCR catalytic reduction of NOx present in the exhaust gas flowing therethrough to nitrogen and water downstream of the SCR catalyst, based on one or more inputs from the one or more sensors and/or control modules.

In embodiments, the system further comprises one or more control modules, and/or one or more system components, each in electronic communication with the controller, wherein the controller is configured to monitor inputs from one or more sensors, one or more control modules, and/or to control one or more system components, and wherein the controller directs power to one or more of the elements based on one or more sensor and/or control module inputs, and/or in unison with controlling one or more system components.

In embodiments, the one or more sensor and/or control module inputs, and/or the one or more system component controls include: an urea water solution (UWS) injection mass, a UWS spray droplet size or size distribution, a UWS injector frequency, a UWS injector duty cycle, a UWS injection pump pressure, an exhaust gas flow rate sensor, a NOx concentration sensor downstream of the SCR catalyst, a NOx concentration sensor upstream of the UWS injector, a NOx concentration sensor between the mixer and the exit of the SCR catalyst, a measure of distribution uniformity of flow and/or reductant downstream of the mixer, an exhaust gas temperature sensor upstream of the UWS injector, an exhaust gas temperature sensor downstream of the UWS injector, a mixer segment temperature sensor, a thermal camera, a mixer temperature distribution, a stored ammonia mass in the SCR catalyst, a stored ammonia distribution in the SCR catalyst, a stored NOx mass in the SCR catalyst, a stored NOx distribution in the SCR catalyst, a stored sulfur mass in the SCR catalyst, a stored sulfur distribution in the SCR catalyst, a stored hydrocarbon mass in the SCR catalyst, a stored hydrocarbon distribution in the SCR catalyst, a stored water mass in the SCR catalyst, a stored water distribution in the SCR catalyst, an Exhaust Gas Recirculation (EGR) setting, a cylinder deactivation setting, a fuel injector timing, a fuel injection mass, an engine load, an elevation, an ambient temperature sensor, a UWS integrity sensor, an engine speed, a fuel composition sensor, or a combination thereof.

In embodiments, the controller utilizes an algorithm, machine learning, a neural network, artificial intelligence, a model, a prediction mechanism calculation, one or more lookup tables, or a combination thereof to select to which of the one or more of the elements to direct power from the external power source, to optimize SCR catalytic reduction of NOx present in the exhaust gas flowing therethrough.

In embodiments, the system is capable of generating an amount of ammonia and/or an ammonia precursor suitable to remove a NOx level of greater than or equal to about 0.5 g NOx/bhp-hr, or greater than or equal to about 300 mg NOx/mile, at an exhaust gas temperature below about 220° C.

In embodiments, the controller is configured to direct an amount of power from the external power source to one or more of the elements to increase the temperature of the exhaust gas flowing therethrough in an amount sufficient to increase a temperature of at least a portion of the SCR catalyst.

In embodiments, a method comprises providing the exhaust gas system according to any one or combination of the embodiments disclosed herein, comprising the exhaust gas mixer according to any one or combination of the embodiments disclosed herein; directing a urea water solution and an exhaust gas comprising an amount of NOx from the exhaust gas source therethrough; and controlling a direction of power from the external power source to at least one of the elements to independently increase or decrease a temperature of at least one element to optimize SCR catalytic reduction of NOx present in the exhaust gas flowing therethrough to nitrogen and water downstream of the SCR catalyst, based on one or more inputs from the one or more sensors and/or control modules.

In embodiments, the electronic controller configured to direct power to at least one element of the mixer, and in electronic communication with one or more sensors or control modules is configured with an algorithm or other programming to detect a low SCR efficiency (e.g., via one or more NOx signal(s) (SNOx) e.g. from pre-/post-SCR NOx sensor(s), from an aftertreatment control module, from a model, from engine ECU or otherwise), thus resulting in lower overall SCR efficiency. The controller algorithm then selecting and directing power to mixer segments situated in one or more of the segments, (e.g., a segment located at the bottom sections of the mixer, hence increasing the reductant concentration mainly produced in the bottom section of the exhaust pipe), and then determining if there is an improvement in the uniformity and/or performance of the reductant concentration arriving at the SCR catalyst thereby optimizing the SCR catalyst performance and by extension, optimize SCR catalytic reduction of NOx present in the exhaust gas flowing therethrough to nitrogen and water downstream of the SCR catalyst, based on one or more inputs from the one or more sensors and/or control modules.

In some embodiments, the controller would utilize predetermined and embedded algorithm(s), the mixer controller thereby configured to determine which mixer segment(s) to energize in order to achieve any desirable reductant concentration and its resultant distribution to enhance the underperforming SCR catalytic efficiency. In addition, such a segmented heated mixer system is suitable to achieve more than just highly controlled reductant uniformity including improvement of other performance metrics as well.

In embodiments, each segment can be energized individually, or in concert with one or more other segments, so to provide an optimal temperature distribution across the mixer structure to increase and/or promote both reductant formation and improved uniformity at the entrance of the downstream SCR catalyst. For example, when a reductant uniformity is determined to be high, the SCR catalyst may receive reductants uniformly and the controller mixer select to heat all, or none, of its segments (amongst other options). However, when the uniformity is determined to be low as detectable by the controller through monitoring the SCR catalyst performance, the controller may select to heat only "some" of its segments and/or to heat segments in certain combinations or permutations, which may be facilitated using one or more trial and performance monitoring, via a predetermined algorithm, to generate both increased reductant concentration and higher uniformity as detectable through the SCR performance. Low, moderate or high temperature, as desired, could be imposed individually on any segment. Some segments may even remain unheated. In addition, or in other embodiments, a segmented heated mixer according to embodiments disclosed herein may be also utilized for other purposes, such as deposit removal, heating of the exhaust and/or preheating of the SCR catalyst, and/or the like.

Such a segmented heated mixer requires a controller to adapt the operation of the segmented mixer to the dynamically changing conditions of the engine system and its environment. Such controllers according to embodiments can control the quantity, rate, and manner in which power (i.e., energy) is delivered to heat individual mixer segments, with an ultimate goal of providing the flexibility to heat the UWS droplets impinging on the mixer to accelerate reductant formation, avoid urea crystallization, and/or to selectively promote reductant uniformity. Such controllers make determinations and assessments based on system sensor data and on-board logic to decide, when, how, at what location, and at what rate to energize the heated mixer segments in order to alter the overall mixer temperature, or mixer temperature distribution, as well as control other parameters by sending signals to other system components for proper system or sub-system performance coordination or optimization.

In embodiments, a segmented heated mixer system includes a segmented heated mixer and methods and devices for controlling said segmented heated urea mixer to reduce NOx emission from combustion engines.

Controlling of the Segmented Heated Exhaust Gas Mixer

Figure 2:
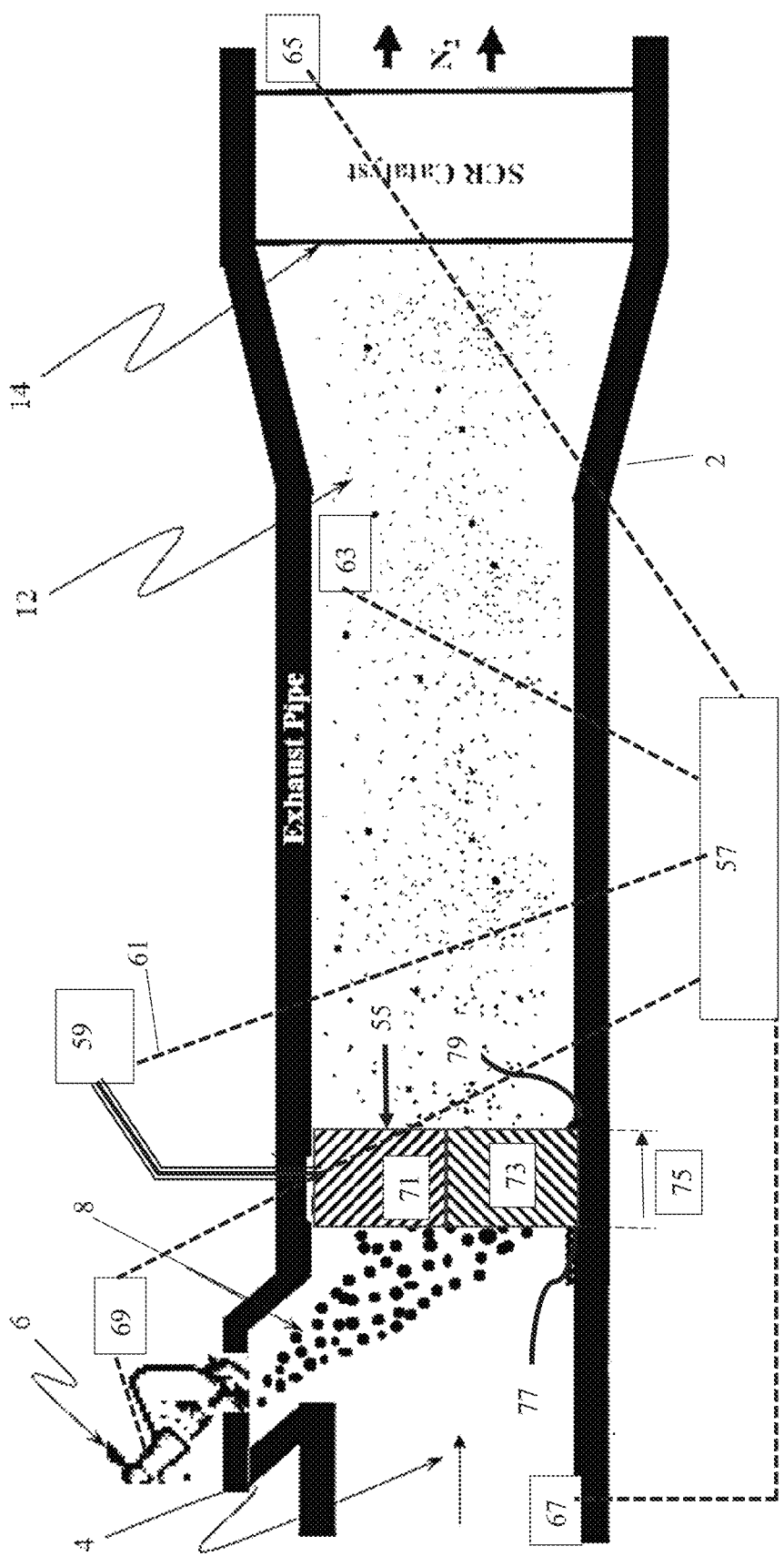
FIG. 2 is a simplified high-level schematic diagram depicting a cross-sectional representation of elements in a portion of a combustion-engine exhaust system having a segmented heated mixer to enhance system performance, according to one or more embodiments disclosed herein.

Referring again to the drawings, FIG. 2 is a simplified high-level schematic diagram depicting a cross-sectional representation of elements in a portion of a combustion-engine exhaust system having a segmented heated mixer to enhance system performance, according to embodiments. The configuration of FIG. 2 can be used to produce an effectively-reduced urea decomposition zone, increase gaseous reductant concentration, and/or increase uniformity quality relative to the configuration of FIG. 1. As shown in FIG. 2, the inventive exhaust gas system for treating an exhaust gas 4 from an exhaust gas source (not shown), comprises an exhaust gas mixer 55 disposed within a conduit, e.g., exhaust pipe 2, downstream of the urea water solution (UWS) injector system 6, and upstream of a selective catalytic reduction (SCR) catalyst 14, and an electronic controller 57 configured to direct power from an external power source 59 to at least one element of the mixer 55, e.g., via electronic communication 61. The controller 57 being in electronic communication with one or more sensors 63, 65, and 67, and/or one or more control modules, e.g., control module 69 of the UWS injector. The exhaust gas mixer 55 comprising a plurality of elements or segments 71 and 73 disposed within a flowpath 75 located between a mixer inlet 77 through which the exhaust gas 4 and a reductant 8 flow into the exhaust gas mixer 55, and a mixer outlet 79 through which the exhaust gas and the reductant flow out of the exhaust gas mixer, at least one of the elements 71 being heatable by the external power source 59 independent of another of the plurality of elements 73. Preferably all of the elements or segments are heatable by the external power source independent of the others. In embodiments, the controller 57 is configured to increase or decrease a temperature of the one or more elements 71 and/or 73 independent of the other elements to optimize SCR catalytic reduction of NOx present in the exhaust gas flowing therethrough to nitrogen and water downstream of the SCR catalyst 14, based on one or more inputs from the one or more sensors e.g., 63, 65 and 67 and/or one or more control modules e.g., 69.

In so doing, the conversion of the urea present in the reductant droplets 8 into ammonia/ammonia precursor is regulated over an effectively-reduced urea decomposition zone which reduces the risk of forming urea deposits, component failure or inefficient operation of the SCR catalyst to reduce NOR. Furthermore, in embodiments, the urea decomposition pipe length 18 of FIG. 1 can be reduced and/or eliminated by moving SCR catalyst 14 closer to the heated segmented mixer 55, resulting in a more compact system. Segmented mixer 55 and the associated components needed for heating of the mixer can be configured and employed to provide configuration and performance flexibility, and to further suit the needs and constraints of the operating system.

Figure 3:
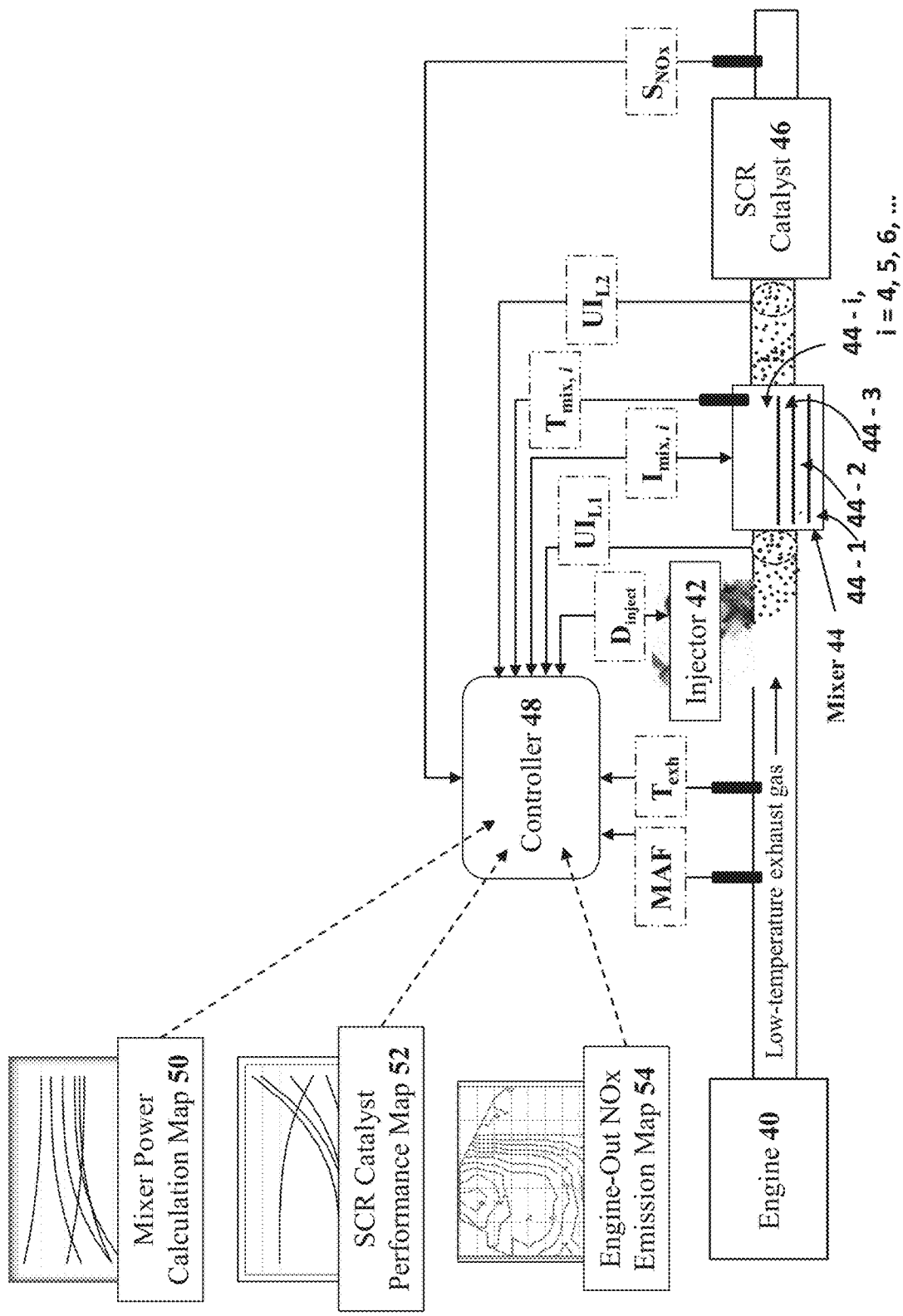
FIG. 3 is a simplified high-level schematic diagram depicting the system architecture of a controller for a segmented mixer, the controller operationally connected to a general representation of the combustion-engine exhaust system of FIG. 2, according to embodiments.

FIG. 3 is a simplified high-level schematic diagram depicting the system architecture of a mixer controller operationally connected to a general representation of the combustion-engine exhaust system according to embodiments. In which the controller is configured to control a direction of power from the external power source to at least one of the elements to independently increase or decrease a temperature of at least one element to optimize SCR catalytic reduction of NOx present in the exhaust gas flowing therethrough to nitrogen and water downstream of the SCR catalyst, based on one or more inputs from the one or more sensors and/or control modules. As shown in FIG. 3, the combustion-engine exhaust is represented by an engine 40 with its exhaust pipe emitting exhaust gas. An injector 42 is shown injecting a UWS spray upstream of a segmented heated mixer 44 itself composed of mixer segments 1, 2, 3, . . . as in 44-$i$ ($i$=1, 2, 3, . . . ). The gas stream continues into an SCR catalyst 46 before exiting the system. Sensors in the exhaust system and control modules associated with various components obtain information from the gas stream including: an exhaust temperature signal ($T_{exh}$), a mass air-flow signal (MAF), injection data ($D_{inject}$) providing UWS spray injection information (e.g., droplet size based on injector pump pressure, injected mass, and frequency, and duty cycle), mixer temperature signal or signals ($T_{mix,i}$ where $i$=1, 2, 3 . . . stands for temperature T of mixer segments 44-$i$ ($i$=1, 2, 3, . . . ), respectively), and a NOx signal ($S_{NOx}$) for measuring NOx concentration downstream of SCR catalyst 46.

A controller 48 is shown including onboard logic relating to a mixer power calculation map 50 and an SCR catalyst performance map 52 (e.g., of ammonia storage, NOx storage, and reduction, potentially partly provided by a UWS injector controller, not shown) of SCR catalyst 46. Controller 48 may optionally incorporate into its on-board logic an engine-out NOx emission map 54 obtained as input, for instance, from the engine's Electronic Control Unit (ECU), from another map, or from a direct, upstream NOx sensor signal (not shown). Alternatively, additional sensors may supply further engine status data to controller 48 such as other ECUs, emission control systems, or sub-components therein. It is noted and understood that the onboard logic embedded in controller 48 described herein may include its own integrated componentry (i.e., hardware, firmware, and/or software) for performing its prescribed functions. Thus, structural componentry such as processors, memory modules, instruction sets, and communication hardware and protocols are implicitly included in the description of controller 48.

Regardless of their sources, such signals may include, but are not be limited to an urea water solution (UWS) injection mass, a UWS spray droplet size or size distribution, a UWS injector frequency, a UWS injector duty cycle, a UWS injection pump pressure, an exhaust gas flow rate sensor, a NOx concentration sensor downstream of the SCR catalyst, a NOx concentration sensor upstream of the UWS injector, a NOx concentration sensor between the mixer and the exit of the SCR catalyst, a measure of distribution uniformity of flow, reductant downstream of the mixer, an exhaust gas temperature sensor upstream of the UWS injector, an exhaust gas temperature sensor downstream of the UWS injector, a mixer segment temperature sensor, a thermal camera, a mixer temperature distribution, a stored ammonia mass in the SCR catalyst, a stored ammonia distribution in the SCR catalyst, a stored NOx mass in the SCR catalyst, a stored NOx distribution in the SCR catalyst, a stored sulfur mass in the SCR catalyst, a stored sulfur distribution in the SCR catalyst, a stored hydrocarbon mass in the SCR catalyst, a stored hydrocarbon distribution in the SCR catalyst, a stored water mass in the SCR catalyst, a stored water distribution in the SCR catalyst, an Exhaust Gas Recirculation (EGR) setting, a cylinder deactivation setting, a fuel injector timing, a fuel injection mass, an engine load, an elevation, an ambient temperature sensor, a UWS integrity sensor, an engine speed, a fuel composition sensor, or a combination thereof.

In one or more embodiments, inputs into the controller may include NOx information such as engine-out NOx emission map 54 providing NOx concentration, pre- and/or post-SCR NOx concentration information (e.g., via signal(s) from pre- or post-SCR NOx sensor(s) such as SNOx, from onboard, model-based algorithm(s) tracking NOx concentration or from a combination thereof; Exhaust temperature information such as $T_{exh}$; Exhaust flow rate information such as MAF; UWS injection information ($D_{inject}$) such as one or combination of injected UWS mass or rate, droplet size, temperature, injection mass, spray cone angle, spray distribution, injection frequency/duty cycle, and/or in combination with other UWS information that may be received from the UWS injector's dosing controller or control module (often called a Dosing Control Unit or DCU); Uniformity index UI of reductant distribution which may include any combination of ammonia, isocyanic acid, and/or unevaporated reductant droplets which mostly convert to ammonia once they enter the catalyst, post-mixer, and/or at the SCR catalyst entrance, for example, as in UI locations $UI_{L1}$ (i.e., spray/exhaust gas distribution information/uniformity at mixer entrance) and $UI_{L2}$ (i.e., reductant/exhaust gas distribution information/uniformity at catalyst entrance); Uniformity index of exhaust gas flow/velocity at a desirable cross-section and/or at the SCR catalyst entrance such as at $UI_{L1}$ and $UI_{L2}$; SAI (Stoichiometric Area Index) at a desirable cross-section and/or at the SCR catalyst entrance such as at $UI_{L1}$ and $UI_{L2}$; SCR catalyst information such as SCR catalyst performance map 52 used in calibration and operation of SCR catalyst 46 such as the catalyst's ammonia and NOx storage (e.g., as a function of catalyst temperature or other parameters thereof), temporal or spatial distribution of ammonia and/or NOx storage, temperature distribution, catalyst aging and adaptation calibration maps, sulfur/hydrocarbon impact map, and/or similar information; Temperature of mixer segments 44-$i$, for instance, may be sensed via model(s), via temperature sensors positioned on the mixer segments as measured through $T_{mix,i}$, by a thermal camera some distance upstream or downstream of the mixer segments, or by temperature sensors in the exhaust gas at a suitable position, or by other means known in the art; Segments' temperature(s) $T_{mix,i}$ (one, two or more signals from each segment or from a variety of segments) which can be determined via measuring the potential difference across mixer segment(s) 44-$i$; Ammonia concentration information from model-based estimators in one or more algorithms in the controller or available external to the controller, or from one or more pre or post SCR ammonia sensor(s) and/or ammonia sensors within the SCR catalyst available in some emission control systems; Heat loss/gain from mixer segments 44-$i$ before and/or after energizing mixer segments 44-$i$ to/from the exhaust flow, for example, from a model embedded in mixer power calculation map 50; Engine's Exhaust Gas Recirculation (EGR) information or its impact, where applicable, on engine-out NOx; Efficiency response of mixer 44 and/or mixer segments 44-$i$, (i.e., power efficiency losses); and/or other parameters of relevance warranted by one skilled in the art.

In embodiments, the mixer controller 48, utilizes onboard logic/embedded algorithms configured to use any combination of input parameters noted above to calculate the power (e.g., wattage) needed to heat energize mixer segments 44-$i$ via mixer input signals ($I_{mix,i}$, i=1, 2, 3, . . . ) in order to provide, preferentially as desired, the necessary heat transfer to the urea droplets of the UWS spray.

In some embodiments, the controller 48 is configured to energize mixer segments 44-$i$ accordingly to increase the UWS droplet temperature upon droplet contact with mixer segments 44-$i$, and hence to increase reductant formation as needed for adequate catalyst performance downstream, and/or controller 48 may energize mixer segments 44-$i$ for various reasons. For instance, mixer segments 44-$i$ may be energized to increase the droplet temperature upon their impingement with mixer segments 44-$i$. Alternatively, since exhaust temperature would change due to heated mixer segments 44-$i$ locally reducing exhaust gas density, controller 48 may heat mixer segments 44-$i$ to induce local gas density variations for impacting flow uniformity and/or flow stratification for example.

In embodiments, the controller 48 utilizes a mixer power calculation map 50 embedded in controller 48 capable of calculating a NOx reduction efficiency. For example, under low temperature exhaust operations where NOx reduction efficiency is low, if the controller determines that NOx reduction efficiency is underperforming, the controller 48 is configured to increase NOx reduction efficiency in SCR catalyst 46 downstream. To achieve this, NOx reduction improvement may be achieved via either increased reductant concentration, or via its improved uniformity (at the SCR catalyst entrance), or via both.

To increase reductant concentration, controller 48 uses certain pre-determined algorithm embedded within to modify/increase $T_{mix,i}$ of one or more mixer segments. Modified/increased $T_{mix,i}$ of one or more selected segments accelerate heating of the injected UWS droplets impinged on those segments, thus increasing reductant formation/concentration. (The controller 48 may in addition signal the injector DCU to modify/increase UWS injection).

To increase reductant uniformity, controller 48 may utilize pre-determined algorithms embedded within to determine how many and which segments (e.g. one, two or more) positioned in what locations (e.g. segments on the top or bottom location on the mixer, or, segments in inner or outer location on the mixer) are to be energized, in what combination(s)/sequence (e.g. first energizing segment 44-2, next/simultaneously segment 44-6, next/simultaneously segment 44-1, etc.), to what target temperature, for how long, and whether to heat each linearly or non-linearly in time (transient, cyclic or modulating the segment heat).

In doing so, the controller 48 for instance may use a sampling method, a random-number generator, a neural network, a perturbation method, a statistical method (embedded initially or learned over time by the controller 48), though other selection/decision-making methods may be employed.

In embodiments, the mixer power calculation map 50 embedded in controller 48 is capable of calculating a reductant Uniformity Index, which is also referred to herein merely as uniformity for simplicity, using various system parameters.

For example, if system NOx reduction efficiency is determined to be underperforming, controller 48 may change one or more $T_{mix,i}$ per certain pre-determined algorithm(s) embedded within (such as sampling various combinations of segments, or via neural network, or via other algorithms) to provide increased reductant, or to improve uniformity to further increase NOx reduction efficiency in SCR catalyst 46 downstream. It is noted that such controlling may include two way communication wherein, for example, $T_{mix,i}$ can be fed back into controller 48 by, for instance, measuring the potential difference across mixer segment(s) 44-$i$.

In general, most of the signals noted above, or additional ones not noted as may be warranted by one skilled in the art, are received by controller 48 and processed for its proper operation of mixer segment 44-$i$. However, there are circumstances in which controller 48 may, in return, issue feedback signals to one or more components noted above or additional ones not noted, coordinating/managing component operation along with the primary functions of controller 48, mixer segments 44-$i$, or SCR catalyst 46. In such circumstances, controller 48 would not be just receiving and processing information for its own purpose, but would also be sending information to components for improved system or sub-system performance which may further include interactions with other controllers and control system in the vehicle.

An example of such ancillary control by controller 48 is urea injection. While urea injectors generally have their own controllers, and are configured to operate mostly independently (though in concert with engine ECU and/or other signals and components) using certain algorithms to meet NOx reduction system needs, controller 48 may not only receive signal information from the urea injector controller (e.g., injection mass, frequency, or duty cycle), but may also send signals/information back to urea injector 42, correlating mixer controller performance with injector controller's calculations of injection mass or other operating parameters.

Another example of such ancillary control by controller 48 is sending and/or receiving signal/information to/from the EGR. Such examples may be easily expanded to other feedback scenarios from/to other components.

There are various ways for controller 48 to continuously assess dynamic changes impacting system performance; such changes could impact the controller's decision-making and/or sent/received signals to/from mixer 44. Controller 48 can be configured to monitor dynamic changes by monitoring any received and/or processed signals such as changes in: any NOx concentration signals from hardware, software, and/or a model-based algorithm in the controller or available external to the controller, exhaust temperature or flow, UWS injected mass, rate, frequency, and/or duty cycle; injection quality such as due to partial blocking of the injector's hole with urea crystals or exhaust soot or due to injector aging; injector environment adaptation referred to as injector DCU adaptation strategies or measures; uniformity indices of flow or reductant; catalyst performance (e.g., NOx reduction efficiency, stored NOx or ammonia, stored NOx or ammonia distribution, catalyst aging, and sulfur/hydrocarbon impact); mixer segment temperature such as due to excess cooling by the exhaust flow or due to unlikely formation of urea crystal deposits on the mixer; ammonia concentration in the exhaust flow and/or as stored in the catalyst (with or without an ammonia sensor implemented); and/or efficiency response of the mixer.

In embodiments, the controller 48 may become aware of any of these changes via hardware signals, software signals, embedded maps, and/or via model-based algorithms or other algorithms available within the external system(s).

In some embodiments, the controller 48 assesses any combination of dynamic changes, mixer power calculation map 50 and is configured to "correct" or update to mixer segments 44-*i* for improved mixer performance, and thus enhanced reductant formation quality and quantity, resulting in augmented NOx reduction catalyst performance.

In one or more embodiments, the controller is configured to assess and correct for dynamic changes in, for example reductant uniformity. While forming proper reductant concentration is key to catalyst performance, applicant has discovered that reductant distribution quality commonly called uniformity or uniformity index, which is a measure of uniform distribution of the reductant at the entrance of SCR catalyst 46 is critical for proper catalyst operation. For purpose herein, the UI utilized by the controller can be determined based on various UI expressions.

Various performance conditions (called UI states) include a parametric correlation matrix which can be constructed as depicted in Table 1 which presents a parametric matrix of exhaust system parameters for different combinations of UI states corresponding to reductant uniformity indices, wherein exemplary UI states are arbitrarily shown by the various matrix path arrows.

Figure 4B:
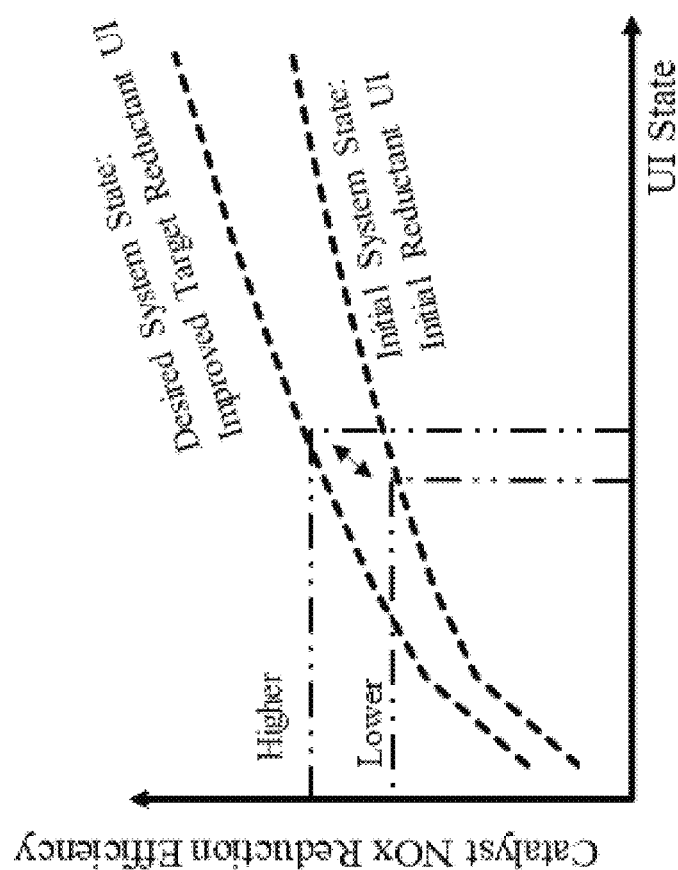
FIG. 4 is a simplified flowchart of the major process steps for a controller assessing and improving the NOx reduction efficiency wherein the controller selects certain mixer segments and energizes them per certain algorithm targeting improving NOx reduction efficiency until it reaches its target reduction efficiency.
Figure 4A:
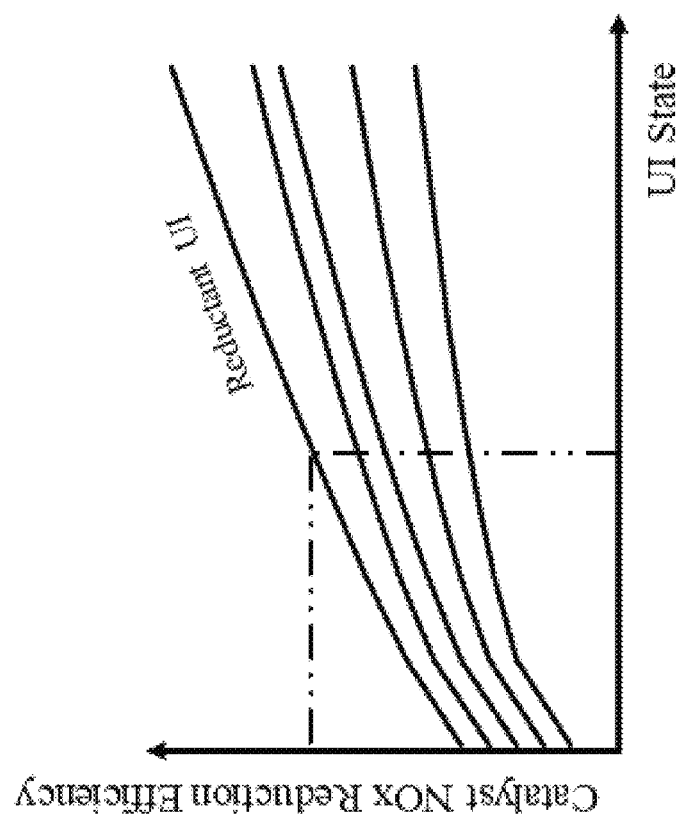
Figure 6C:
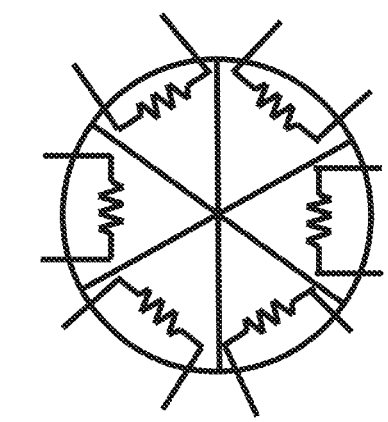
FIG. 6C is a schematic representation of a segmented heated mixer with mixing segments configured in sectors of a circle-type shape.
Figure 6F:
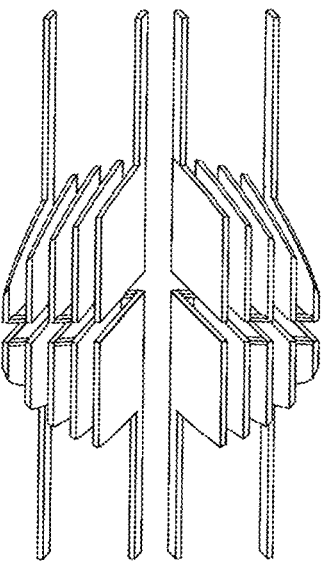
FIG. 6F depicts a segmented heated mixer according to embodiments disclosed herein.
Figure 6B:
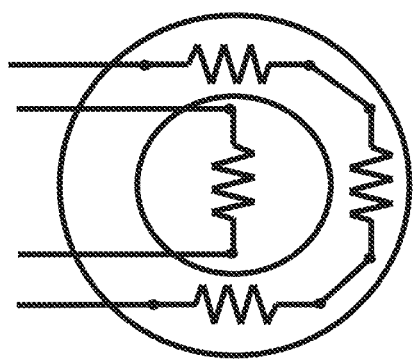
FIG. 6B is a schematic representation of a segmented heated mixer with mixing segments configured in concentric-type rings.
Figure 6E:
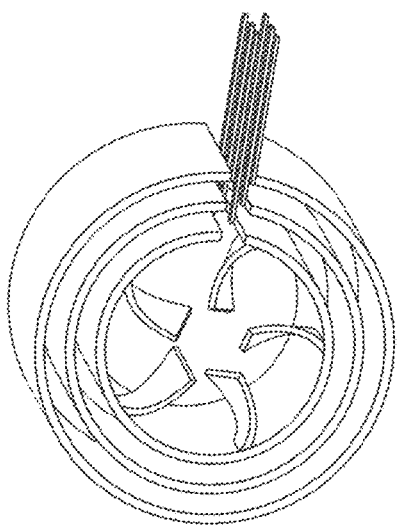
FIG. 6E depicts a segmented heated mixer with segments configured in a concentric circular configuration with a swirl-inducing element according to embodiments disclosed herein.
Figure 6A:
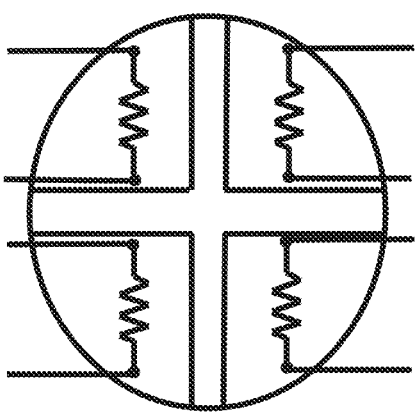
FIG. 6A is a schematic representation of a segmented heated mixer with mixing segments configured in a quadrant-type arrangement.
Figure 6D:
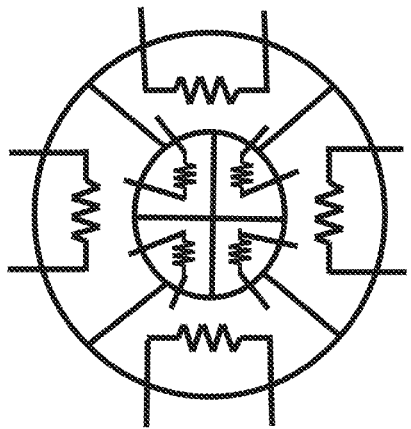
FIG. 6D is a schematic representation of a segmented heated mixer with mixing segments configured in a combination of quadrant-type and circular-type arrangement.

In such an embodiment, each UI state has its own reductant uniformity index. A judicious selection of performance parameters enables predictive capabilities for all applicable UI states pertaining to various performance conditions. FIG. 4A depicts a graph of the collective exemplary UI states, resulting from a parametric matrix study exemplified in Table 1 shown in FIG. 14, to form a predictive map of reductant UIs, according to embodiments. The mapping of collective UI states allows predictive capability of reductant UIs under various operating conditions.

In embodiments, the controller is configured to construct a predictive map as shown in FIG. 4A, wherein the UIs are derived for all states in the matrix e.g., as shown in Table 1, in practical combinations of several low, mid, or high values, wherein it is understood that low, mid, or high values can correspond to a plurality of data points over a range of values. For example, in 15-liter diesel engine, parameters of operating conditions captured in a matrix such as in Table 1, given as combinations of low/high exhaust mass flow rate (e.g., about 300-1,500 kg/hr), low/high flow temperature (e.g., about 120-400° C.), low/high UWS injection rate (e.g., about 1-100 g/min.), EGR setting (e.g., about 10-35%), and engine-out NOx emission (e.g., about 1-4 g NOx/bhp-hr). Other values of interest can also be included such as mass of stored ammonia in the SCR catalyst (e.g., about 0.1-10 g). Mixer segment temperature (e.g., about 100-400° C.) can be included.

In embodiments, different approaches may be taken to derive corresponding UI for each state: experimental setups, computer simulations, mathematical modeling, or a combination thereof. Other values include system hardware geometry (e.g., exhaust pipe size, shape, and mixer geometry), flow rate/temperature combinations, UWS injection conditions (e.g., rate and droplet size), and/or other parameters of interest. Experimental approaches to measure each UI state may include using a cross-flow porous membrane and spray visualization to determine distribution uniformity (cf. US Patent Publication No. 2016/0239954A1), or by positioning a gas analyzer repeatedly at several points in a given flow cross-section of interest to measure pointwise reductant concentrations, from which the UI state could be readily calculated.

In one embodiment, the expression for determining UI is:

$$\gamma = 1 - \frac{\sum \sqrt{(\omega_i - \overline{\omega})^2}}{2n\overline{\omega}},$$

which may be used to calculate the reductant UI shown as y, a value between zero (i.e., very poor distribution) and one (i.e., perfect distribution) for each state. In general, the closer y is to one, the better the uniformity quality, and hence the better the catalytic performance. In most practical applications, it has been discovered that a target in the range of about 0.9-1 is suitable, although other values may be desirable depending on system requirements and performance metrics. In the expression, $w_i$ is the 'local' (pointwise) value of reductant concentration at various points in a cross-section, while $\overline{w}$ is the average reductant concentration (averaged over the full cross-section); n is the number of measurement points taken.

In embodiments, the values of all UIs for various states are used to produce a predictive map as in FIG. 4A, leading to mixer power calculation map 50 of FIG. 3 which is embedded in controller 48 to enable UI predictive capability under various system performance conditions. Accordingly, in embodiments, $UI_{L1}$ and $UI_{L2}$ of FIG. 3 are predictive UIs (not measured UIs) for given locations in the flow stream. Mixer power calculation map 50 takes parameters other than UI states into account.

In some embodiments, not all possible combinations of parameters in the matrix of Table 1 need to be produced. In some embodiments, determination of UI for only certain select parametric combinations e.g., the outermost and innermost boundaries of the matrix and some UIs in between, is appropriate. UI values for other combinations can be determined using interpolation or extrapolation according to methods known in the art.

Controller 48 of FIG. 3 has no control over several parameters such as fixed (i.e., unchangeable) hardware (e.g., pipe diameter/length, mixing length, UWS injection position, and droplet size); likewise, when configured, controller 48 may have limited or no control over engine parameters such as exhaust flow rate and temperature. However, controller 48 does have control over $T_{mix,i}$ to freely alter each mixer segment the temperature (segment-wise or the overall distribution throughout the mixer plurality); it may further send/receive signals to/from, UWS injection frequency and duty cycle (by communicating with injector DCU requiring desired UWS injection mass flow rate, frequency, and duty cycle), and EGR (by requiring the EGR to increase or decrease engine-out NOx, thereby influencing UWS injection mass flow rate, as well as other parameters) such as $T_{mix,i}$ since an optimal temperature distribution amongst mixer segments (as controlled by controller 48) promotes improved reductant formation spatially, temporally and preferentially in the exhaust gas post mixer 44, as well as reductant mixing and transport with the base flow, and hence improved uniformity and reductant concentration.

In embodiments, the controller utilizes various combinations to compensate for lower reductant distribution quality, and hence to improve reductant UI at the entrance to SCR catalyst 46.

Another aspect in which controller 48 can enhance system performance is to remove urea crystal deposits. When an engine is initially started, before it reaches higher temperatures (e.g., during the first few minutes of operation), mixer segments 44-*i* can be heated, if needed preferentially and in certain combination where more deposit may be anticipated, without any or before any urea injection commences, in order to burn off any residual deposits retained from previous drive cycle. If $S_{NOx}$ (downstream of SCR catalyst 46) signals an unusual increase or spike in ammonia ($S_{NOx}$ can respond to both NOx and ammonia), it indicates the presence of solid urea and its sublimation. Thus, crystals deposits are/were present in the exhaust pipe could be burned off near the segment energized, and are being removed by the additional help in heating the exhaust gas using heated mixer segments 44-*i* which in turn raise the exhaust gas temperature thus sublimating urea deposits.

Another aspect in which controller 48 can enhance system performance is to prime mixer segments 44-*i* with a relatively small amount of injected urea such as during an engine cold-start before the mixer is heated (by supplied power, by exhaust gas flow, or a combination of the two). When mixer segments 44-*i* subsequently heat up (independent of reduced DPF size in 44-*i*), the urea-primed mixer provides ammonia to SCR catalyst 46 for ammonia storage.

Another aspect in which controller 48 can enhance system performance or perform diagnostics is to use higher pressure signals in the exhaust gas due to the presence of urea crystals plugging the exhaust system or components within. Controller 48 can increase $T_{mix,i}$ by supplying wattage to mixer segments 44-*i* (i=1, 2, 3, . . . ) without injecting urea. If $S_{NOx}$ (for instance from downstream of SCR catalyst 46) signals an unusual increase or spike in ammonia ($S_{NOx}$ can respond to both NOx and ammonia), it indicates the presence of solid urea and its sublimation. Thus, deposits in the exhaust pipe could be burned off by heating mixer segments 44-*i*, which in turn heats the exhaust gas temperature thus sublimating urea. Another possible source for such crystal deposits is as residue in the exhaust pipe from a previous run before the engine was turned off.

Another aspect in which controller 48 can enhance system performance is to use the UI predictive map to influence UI in systems in which a heated mixer is absent. For instance, UI can be influenced by changing UWS injection frequency and duty cycle, or signaling change to the EGR.

FIG. 5 is a simplified flowchart of the major process steps executed by Controller 48 to yield higher NOx reduction efficiency for an initial system state to a desired system state having a target reductant UI using parameter control changes, according to embodiments. The process starts with the controller first assessing NOx reduction efficiency (step 60) by either assessing internally using system conditions/info, or it may alternatively receive such efficiency information from a source external to the controller. Next, the controller 48 determines if the system NOx reduction efficiency is improvable. If not, then the process ends (Step 72). If improvable, then the controller calculates the controller 48 utilizes its algorithm and/or other system input information, starts a process of selecting certain mixer segments, energizing them, either together or in a certain sequence, to same or different temperature targets, for same or different durations, linearly or non-linearly, and so on (step 64). In doing so, the controller 48 may use a sampling method, a random-number generator, a neural network, a perturbation method, a statistical method (embedded initially or learned over time by the controller 48), though one may employ other selection/decision-making methods. Throughout this process, the controller 48 continually, or as often as needed, re-assesses the NOx reduction efficiency (step reductant UI given system conditions/information (Step 62). Steps 60 and its improvability (step 62). The controller 48 stops when a desirable or target NOx reduction efficiency is reached (step 72). define the initial system state. However, it is to be understood that the controller then again begins the process based on an initial system state while in operation.

Figure 8D:
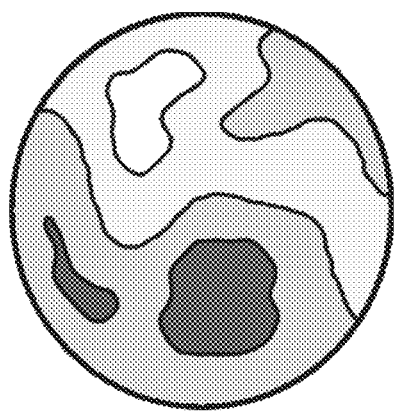
FIG. 8D depicts a stored reductant spatial profile in a radial cross-section of the SCR catalyst according to an embodiment disclosed herein.
Figure 8E:
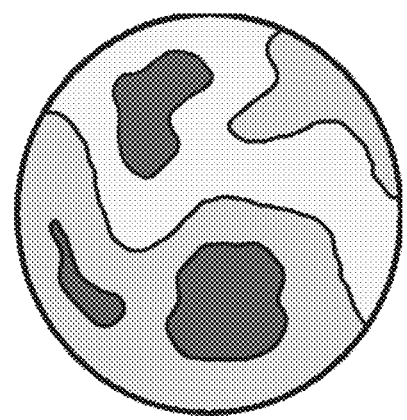
FIG. 8E depicts a stored reductant spatial profile in a radial cross-section of the SCR catalyst according to another embodiment disclosed herein.
Figure 8A:
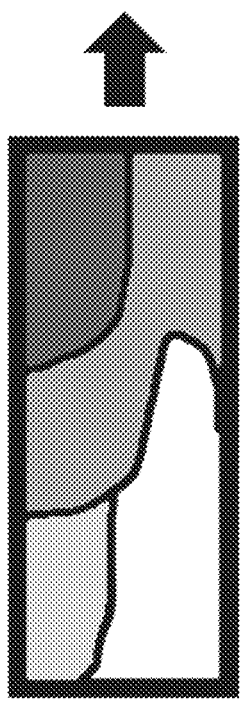
FIG. 8A depicts a stored reductant spatial profile in a cross-section of the SCR catalyst with poor loading uniformity of the reductant and NOx.
Figure 8B:
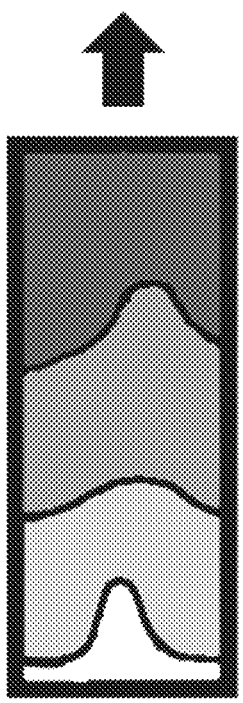
FIG. 8B depicts a stored reductant spatial profile in a cross-section of the SCR catalyst with good or improved loading uniformity of the reductant and NOx according to embodiments disclosed herein.
Figure 8C:
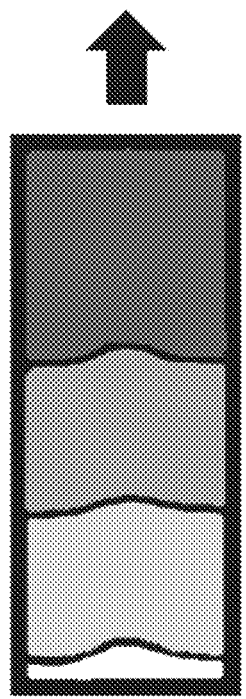
FIG. 8C depicts a stored reductant spatial profile in a cross-section of the SCR catalyst with essentially optimal loading uniformity of the reductant and NOx according to embodiments disclosed herein.

As shown in FIG. 8A, representing a model of various reductant, NOx or hydrocarbon distribution in an SCR catalyst, a poor-non-uniform (uneven) distribution of reductant and/or other species, reduces catalytic efficiency, while as shown in FIGS. 8B and 8C, a more uniform distribution of reductant or other species as obtained utilizing the exhaust gas mixer and system disclosed herein results in an increased to optimal NOx catalytic efficiency. In addition, in an embodiment, controlling a segmented heated mixer can be used to promote and/or control ammonia storage and/or the storage of other species in the SCR catalyst either longitudinally and/or radially within the SCR catalyst as shown in FIGS. 8D and 8E.

In an embodiment there is provided a device for controlling a segmented heated mixer, situated downstream of a Urea-Water Solution (UWS) injector, to reduce NOx emission in an exhaust system from combustion engines, wherein the exhaust system has a Selective Catalytic Reduction (SCR) catalyst situated downstream of the UWS injector and the segmented heated mixer, the device including: (a) a CPU for performing computational operations; (b) a memory module for storing data; (c) a controller module configured for: (i) determining a NOx reduction efficiency of the SCR catalyst; and (ii) evaluating at least one reductant Uniformity Index (UI) based on operating parameters of the exhaust system and a mixer power calculation map; and (iii) modifying a mixer temperature distribution of the segmented heated mixer by regulating power to the heated mixer segments based on at least one reductant UI in order to improve at least one reductant UI and/or improve the NOx reduction efficiency.

In some embodiments the operating parameters include at least one parameter type selected from the group consisting of: an injected UWS mass, an injector frequency, an injector duty cycle, an injection pump pressure, an exhaust gas flow rate, a NOx concentration downstream of the SCR catalyst, a NOx concentration upstream of the UWS injector, an exhaust gas temperature upstream of the UWS injector, an exhaust gas temperature downstream of the UWS injector, a mixer temperature distribution, a stored ammonia mass in the SCR catalyst, a stored NOx mass in the SCR catalyst, a stored sulfur mass in the SCR catalyst, a stored hydrocarbon mass in the SCR catalyst, an Exhaust Gas Recirculation (EGR) percentile setting, an engine load, and an engine speed.

In some embodiments, a plurality of the reductant UIs forms a basis for at least one UI state, and wherein at least one UI state is indicative of a relative NOx reduction efficiency.

In some embodiments, at least one reductant UI is evaluated for at least one specific location in the exhaust system, and wherein at least one specific location includes a catalyst location upstream of the SCR catalyst and/or a mixer location upstream of the segmented heated mixer.

In some embodiments, the modifying includes at least one parameter change selected from the group consisting of: changing an injected UWS mass, changing an injector frequency, changing an injector duty cycle, changing an injection pump pressure, and changing an Exhaust Gas Recirculation (EGR) percentile setting.

In some embodiments, the controller module further is configured for: (iv) validating at least one reductant UI and/or the mixer power calculation map based on the operating parameters of the exhaust system.

In some embodiments, the controller module further is configured for: (iv) detecting at least one potential improvement of at least one UI and/or the NOx reduction efficiency based on an increased ammonia mass in the exhaust system.

In some embodiments, the controller module further is configured for: (iv) prior to the determining, removing urea crystal deposits by regulating power to the heated mixer segments prior to any UWS injection in the exhaust system.

In some embodiments, the controller module further is configured for: (iv) prior to the determining, priming the heated mixer by instructing the UWS injector to inject UWS onto the heated mixer.

In some embodiments, the controller module further is configured for: (iv) prior to the determining, increasing power to the heated mixer segments prior to any UWS injection in the exhaust system; (v) prior to the determining, measuring an increased ammonia mass in the exhaust system; and (vi) prior to the determining, identifying a urea crystal blockage of the exhaust system based on: (A) observing a higher exhaust gas pressure than under normal operating conditions of the exhaust system; and (B) the increased ammonia mass in the exhaust system.

Segmented Heated Exhaust Gas Mixer

In embodiments, an exhaust gas mixer comprises a plurality of elements or segments disposed within a flowpath located between a mixer inlet through which an exhaust gas and a reductant flow into the exhaust gas mixer, and a mixer outlet through which the exhaust gas and the reductant flow out of the exhaust gas mixer, at least one of the elements or segments is heatable by an external power source independent of another of the plurality of elements. In preferred embodiments, the exhaust gas mixer comprises at least two elements or segments that are heatable by an external power source independent of another of the plurality of elements. In still other embodiments, each of the plurality of elements or segments are independently heatable by the external power source.

FIGS. 6A through 6J show various embodiments of a segmented mixer, including, a number of different arrangements and combinations of segmentation that a segmented heated mixer may include. Each segment of the segmented mixer may be geometrically configured to optimize droplet impingement and/or promote fluid film development on the segment, or to yield certain flow configuration. Segments may be heated preferentially, to achieve certain temperature distribution across the segmented mixer, so to maximize droplet heating and fluid film evaporation while at the same time improving/promoting reductant uniformity downstream of the mixer at the inlet to the SCR catalyst.

In some embodiments, the segmented heated mixer include a plurality of segments between the mixer inlet 77 and the mixer outlet 79 along the flowpath 75 of the exhaust gas 4 and the reductant 8 as shown in FIG. 7, wherein at least one of the segments 250, 251, 252, and 254 is heatable independent of the others. As shown in FIG. 7, the plurality of elements or segments may be arranged longitudinally along the length of the flow path between the mixer inlet reasonably normal to the general flow direction, or a combination thereof. Each mixer segment may include one or more embodiments such as flow swirlers, circular sectors, concentric rings, and the like. In embodiments, one or more of segments 250, 251, 252, and 254 may be energized, for instance heated due to their electrical resistance, independently of one another, in certain sequence, or in certain increments or decrement. 256 and 258 refer to the positive and negative electric terminals of 250, respectively. In another embodiment, the negative terminal is simply the ground provided by the exhaust pipe 2, as indicated by ground 259. Likewise, 260 and 262 refer to the positive and negative electric terminals of 252, and 264 and 266 refer to the positive and negative electric terminals of 254. Each segment may be the same or different.

As shown in FIG. 7, in embodiments, the plurality of elements are arranged within the flowpath such that no linear flowpath (as represented by dotted arrow 270) from the mixer inlet to the mixer outlet exists. Stated another way, the elements are arranged such that no line of sight exists between the inlet and the outlet.

Figure 9:
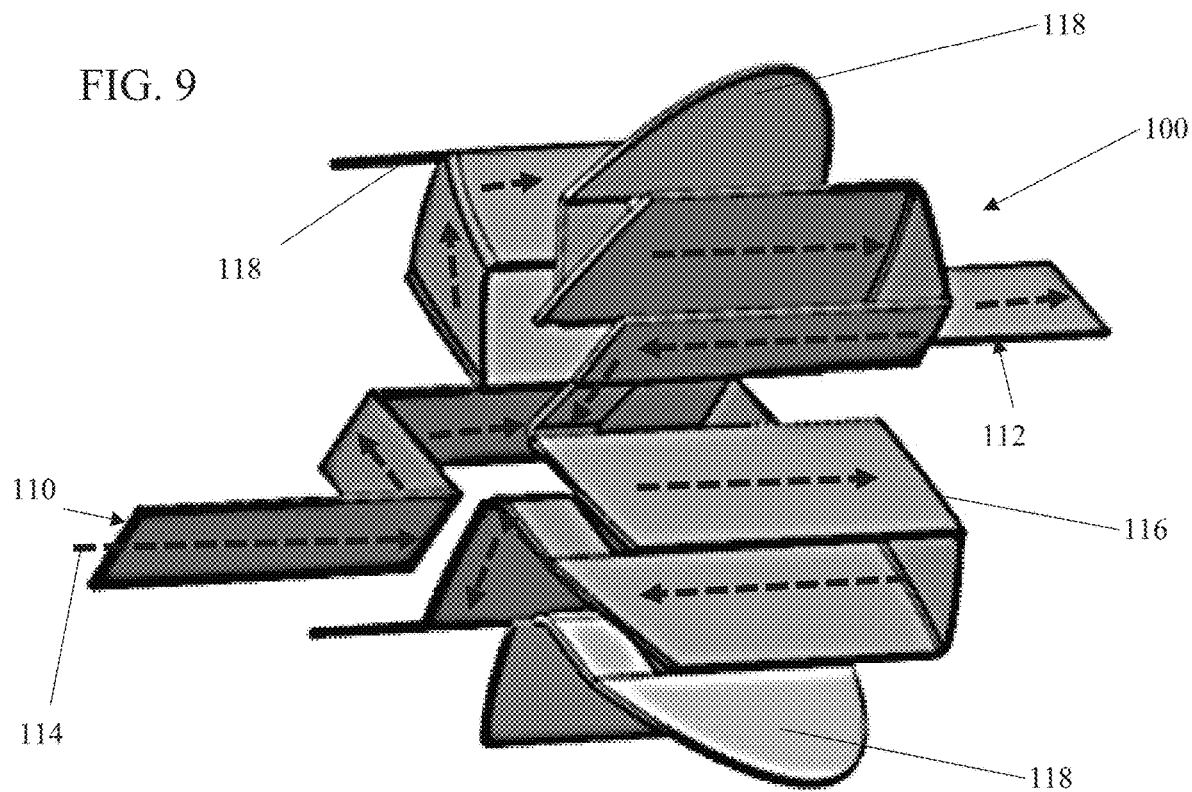
FIG. 9 shows a mixer element having a ladder arrangement along with pendant unheated elements or segments according to embodiments disclosed herein.

As shown in FIG. 9, in embodiment the mixer element is arranged in a ladder type confirmation, at least one element of the mixer, generally indicated as 100, comprises a main portion between a current inlet 110 and a current outlet or ground 112. A first portion of the mixer element comprising the shortest electric flowpath (i.e., the main pathway) between the power source and a ground through which the current flows (indicated by dotted line 114), such that the main portion of the element 116 is resistively heated to a first temperature when a sufficient amount of an electric current 114 flows through the element, and one or more secondary portions 118 which are arranged pendant to the main portion e.g., which are physically attached to the main portion but which depend away from the main portion such that little to no current flows through the pendent portions. Accordingly, as current flows through the element, the pendent portions are resistively heated, if at all, to a second temperature below the first temperature when the same electric current flows through the element.

Accordingly, in embodiments, the resistively-heated mixer may include at least one component not resistively-heated. In one such embodiment, the mixer element or segment attaches to the totality of the heatable element and is arranged to receive heat only via conduction from other mixer structures that are resistively heated.

Figure 10:
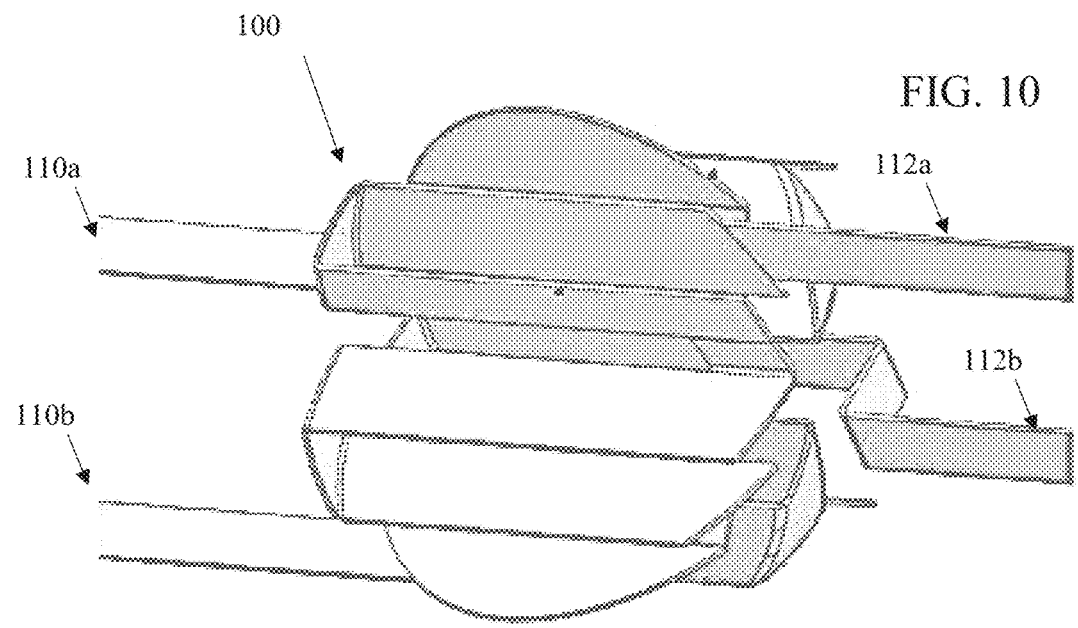
FIG. 10 shows a pair of individually heatable elements each having a separate current inlet and outlet according to embodiments disclosed herein.

In other embodiments, as shown in FIG. 10, which shows two heatable elements arranged to overlap one another, the mixer comprises a plurality of elements wherein each of the plurality of elements are independently heatable by an external power source, i.e., each includes a current inlet 110a and 110b, and a current outlet or ground 112a and 112b.

Figure 13:
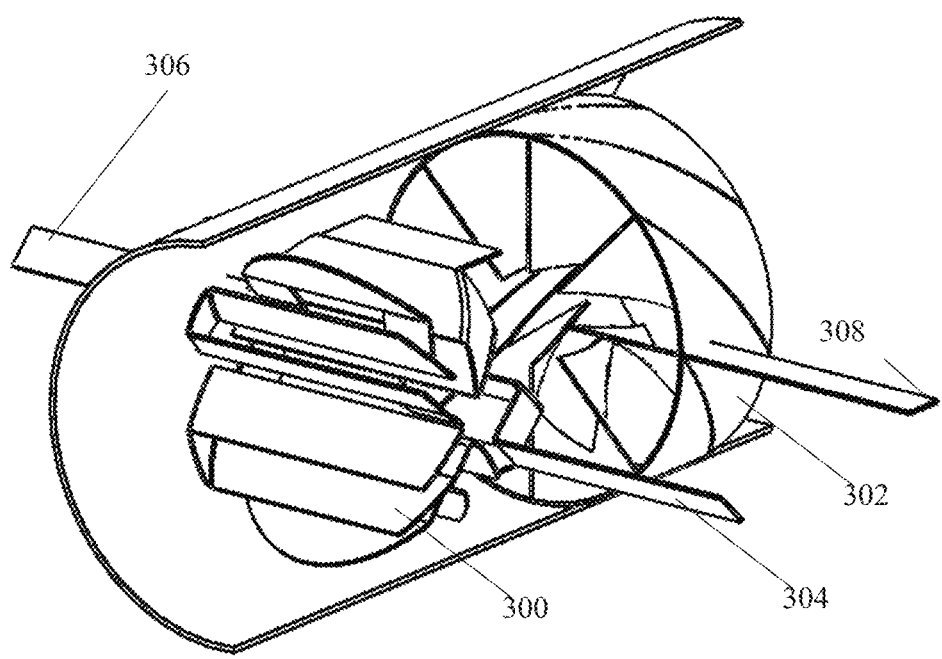
FIG. 13 shows an exhaust gas mixer comprising multiple elements of different types having a linear arrangement according to embodiments disclosed herein.

As shown in FIG. 13, in an embodiment the mixer includes a first heatable element 300, which is electrically heated via electrical connections 304 and 306 independent of the second element 302, which may be electrically heated via electrical connection 308 to ground.

In embodiments, each of the plurality of the mixer elements may or may not be heated, or may not be heated uniformly, or may not be heated for the same purpose, or may not be heated using the same design features, or may or may not be coated, in part or in full, or may be coated in different segments (sections) using different coating materials or for different purposes, or may or may not be heated using one or more energy path (for instance when electrically heated), or may use other design, material or performance feature yielding other desirable performance targets or combinations thereof.

In embodiments, the segmented mixer heating may be dimensioned and arranged to achieve particular purpose(s), e.g. to increase reductant uniformity via heating of certain mixer regions to improve NOx reduction efficiency of the SCR catalyst, or to minimize the mixer power consumption, or to use the heated mixer to increase the exhaust temperature in a certain temperature distribution profile, or to remove urea deposit which may have formed on certain segments of the mixer but not on all the mixer plurality, and so on, and/or other purposes may exist to heat only certain mixer segment(s), but not more or all segments.

In one embodiment, the segmented mixer is arranged for forming a liquid film on the segments so to maximize transformation of UWS to gaseous ammonia. This is in contrast to devices designed mainly to prevent deposits and/or to raise the temperature of an exhaust gas.

In embodiments, the heated, segmented mixer according to the instant disclosure is uniquely designed to operate and function at exhaust gas temperatures below 200° C., transforming the UWS into gaseous reductants, with little or no increase in the overall exhaust gas temperature.

In embodiments, some segments may be heated while other segments may not, it may be warranted to heat different heated segments to different temperatures. For instance, it may be warranted to heat certain segments to higher temperature(s) to accelerate heating and evaporation of UWS droplets impinging on those segments (to increase ammonia formation), while other segments may be heated only modestly to reduce the risk of deposit formation on those segments.

In embodiments, the segments or heatable elements may be heated differently: temporally, spatially or a combination thereof. In some embodiments, the heated segments may be heated to different temperatures and/or at different times. Likewise, segments that are not heated at one time, may be heated at other times. Further, any heated segment may be heated to a different target temperature (low or high) at different times. The temperature of any one segment, or temperatures of plurality of few segments, may be fixed in time, or may be transient (vary) in time for that or those segments. Likewise, the temperature of any given segment may be constant throughout the segment, or may vary through the segment in any given instance in time.

In some embodiments, one, two, or more, or all of the mixer segments may be coated. In one such embodiment, at least a portion of the segment or element is coated with hydrophilic material, with hydrophobic material, or with other coatings. In embodiments, suitable coatings include ceramic materials comprising oxides of titanium, molybdenum, tungsten, and the like. Other suitable coatings include zeolites, and/or precious metals Still other suitable coatings may include various forms of carbon alone or in combination with other materials. In an embodiment, the coatings include titanium oxide ($TiO_2$).

In embodiments, the surface topography or morphology of any one, two, more, or all of the mixer segments may be smoothed, or roughened, or stippled, or embellished, or its smoothness modified otherwise, so to impact the droplets impinging on such segment(s) for instance to accelerate secondary atomization of droplets, or to impact heat exchange between the mixer segment(s) and the impinging droplets, or to impact certain droplet dynamics when impinging on the mixer segment(s), or to impact the exhaust gas flow interacting with the mixer segment(s), or to impact other metrics of heat and/or mass exchange between the segment(s) with the exhaust gas flow and or the droplets.

In embodiments, the mixing elements may be formed from a variety of materials depending on their use and applications. Preferably, the mixing elements are made of conducting materials such as metals especially stainless steel, various chromium alloys, and the like.

Figure 11:
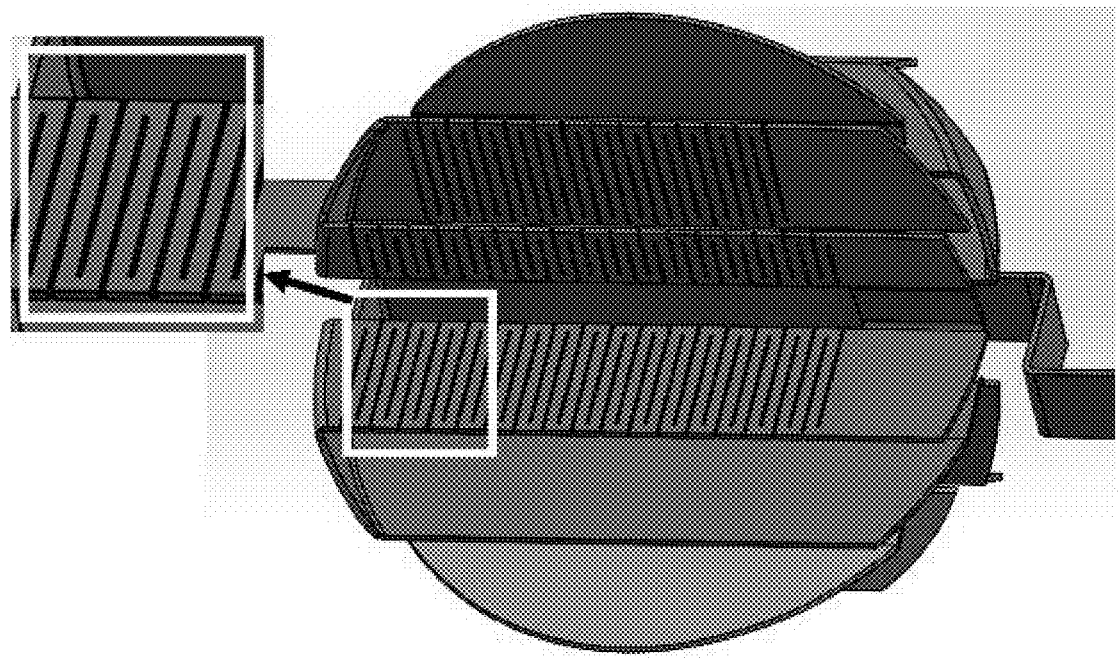
FIG. 11 shows a sawtooth profile of a heatable mixing element according to embodiments disclosed herein.
Figure 12A:
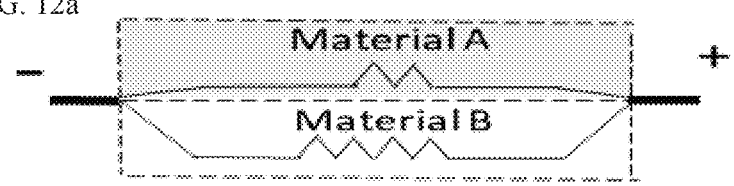
FIG. 12a shows an element formed from two different materials according to embodiments disclosed herein.
Figure 12B:
FIG. 12b shows an element formed from two different materials according to alternative embodiments disclosed herein.
Figure 12C:
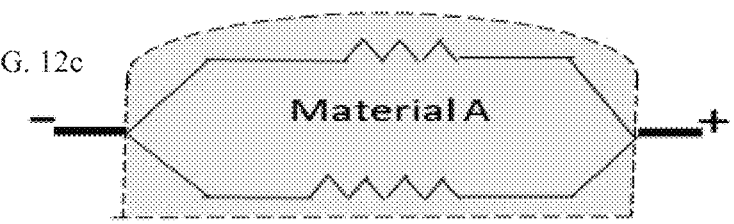
FIG. 12c shows an element formed from the same material with different zones having different electrical resistance according to alternative embodiments disclosed herein.
Figure 12D:
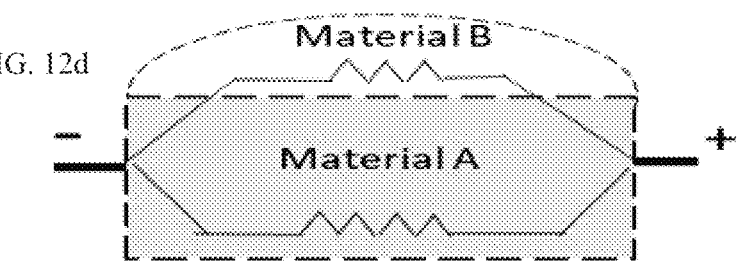
FIG. 12d shows an element formed from two different materials according to alternative embodiments disclosed herein.

When a mixer is made of highly conductive materials such as a metal, the mixer element may be heated via passing electrical current through it, the local temperature of any of its segment depends on the segment's local, electrical resistance. Thus, any of one, two, more, or all of the mixer segments may be contoured in any specific shape or shapes to yield certain local resistance(s) and hence certain local temperature(s) in such segment(s). As an example, the path of the flow of the electricity can be engineered to take a less- or a more-tortuous path, in order to increase or decrease the local resistance in a segment or in several segments. One such exemplary contour is the sawtooth shape or profile shown in FIG. 11 so to yield a certain temperature profile locally on the segment. As shown in FIGS. 6G, 6H, and 6J, in embodiments, one or more of the mixer elements comprise one or more nozzles 601, flow diverters 602, fins 603, appendages 604, holes 605, cross sectional profiles 606, bends 607, twists 608, or a combination thereof. In one or more embodiments, at least one element comprises a plurality of zones, wherein at least one zone comprises a different metal or metal alloy relative to another of the zones, a metallic foam, a 3D-printed structure, an additive manufacture structure, or a combination thereof. In embodiments, one or more coating layers disposed on an electrically conductive substrate comprising a catalytically active material suitable to produce ammonia and/or an ammonia precursor from urea; a hydrophobic surface; a hydrophilic surface; and or a morphology which facilitates secondary atomization of droplets contacting the element. In some embodiments, at least a portion of a surface of at least one element comprises an RMS roughness of greater than or equal to about 50 microns, ore greater than or equal to about 100 microns, or greater than or equal to about 200 microns, or greater than or equal to about 500 microns.

In some embodiments, at least a portion of a surface of at least one element comprises an RMS roughness of less than or equal to about 50 microns, or less than or equal to about 20 microns, or less than or equal to about 10 microns.

In some embodiments, at least a portion of a surface of at least one element comprises a stippled morphology, characterized by a plurality of depressions and/or "bumps" in a uniform or non-uniform arrangement.

In some embodiments, at least a portion of a surface of at least one element comprises a porous morphology, preferably having an average pore size greater than or equal to about 1 micron, or greater than or equal to about 50 microns, or greater than or equal to about 100 microns. In some of such embodiments, the pores extend through the element, while in others, the pores extend only partially into the element.

As shown in FIGS. 13a-13d, when electrically heated, the local temperature of any one segment depends on its local resistance. In some embodiments, the segment resistance comprises one or more resistances, in series or in parallel, due to the material(s) or due to the segment shape, or a combination thereof, in order to yield a desirable, local temperature profile (distribution) in the segment. In the examples shown in FIG. 12a through 12d, series or parallel resistances may be used and/or various materials and/or using appropriate shapes, or a combination thereof may be used to achieve the desired effect. Likewise, an actively segmented mixer may require each series of its connected segments to need one pair of electrodes (on set of negative and positive connectors).

In embodiments, any of one, two, more, or all of the mixer segments may be made of a single material, or of a plurality of materials, so to allow different heating responses in different mixer segments. The mixer segment materials may be also porous or non-porous; or may be metallic foam(s), so to allow a different morphology, or to allow morphology variations, in the mixer structure, or to manage the mixer mass, or to increase local resistance, or to allow capillary effect to trap liquid droplets into the mixer pores for prolonged heating. In an embodiment, a metallic foam is utilized. In embodiments, at least a portion of the mixer or the segments and/or the entire mixer may be 3D-printed, and/or produced by additive manufacture. Any of one, two, or more mixer segments may be designed as to not be heated; such segments may be used to impact the distribution, swirling, and pressure drop of the flow.

Method to Use a Segmented Exhaust Gas Mixer

In embodiments, a method comprises providing an exhaust gas system comprising an exhaust gas mixer according to any one or combination of embodiments disclosed herein, disposed within a conduit downstream of a urea water solution (UWS) injector system, and upstream of a selective catalytic reduction (SCR) catalyst, and an electronic controller configured according to one or more embodiments disclosed herein which directs power to at least one element of the mixer, and which is in electronic communication with one or more sensors or control modules according to one or more embodiments disclosed herein.

In embodiments, the method further includes directing a urea water solution and an exhaust gas comprising an amount of NOx from the exhaust gas source through the exhaust gas system (i.e., therethrough), and controlling a direction of power from the external power source to at least one of the elements according to one or more embodiments disclosed herein to independently increase or decrease a temperature of at least one element of the mixer, thereby to optimize SCR catalytic reduction of NOx present in the exhaust gas flowing therethrough (e.g., from a first initial NOx concentration present in the exhaust gas at the inlet of the mixer, to a lower NOx concentration in the exhaust gas determined at an exit of the SCR catalyst), such that the NOx initially present in the exhaust gas stream is converted into nitrogen and water downstream of the SCR catalyst; the optimization being based at least on one or more inputs from the one or more sensors and/or control modules.

In embodiments, the method results in generating an amount of ammonia and/or an ammonia precursor suitable to remove a NOx level of greater than or equal to about 0.5 g NOx/bhp-hr, or 1 g NOx/bhp-hr, or 3 g NOx/bhp-hr, or 5 g NOx/bhp-hr, or 7 g NOx/bhp-hr, at an exhaust gas temperature below about 250° C., or 220° C., or 200° C., or 180° C., or 150° C.

In embodiments, the method results in generating an amount of ammonia and/or an ammonia precursor suitable to remove a NOx level of greater than or equal to about 200 mg NOx/mile, or about 300 mg NOx/mile, or about 400 mg NOx/mile, or about 500 mg NOx/mile, at an exhaust gas temperature below about 250° C., or 220° C., or 200° C., or 180° C., or 150° C.

In embodiments is a method for controlling a segmented heated mixer, situated downstream of a Urea-Water Solution (UWS) injector, to reduce NOx emission in an exhaust system from combustion engines, wherein the exhaust system has a Selective Catalytic Reduction (SCR) catalyst situated downstream of the UWS injector and the segmented heated mixer; the method includes the steps of: (a) determining a NOx reduction efficiency of the SCR catalyst, or of the system, whichever appropriate); (b) assessing whether the NOx reduction efficiency is improvable; (c) heating and evaluating at least one, two, more or a combination of mixer segments, using a certain algorithm (described below) to produce a desirable reductant Uniformity Index (UI) based on operating parameters of the exhaust system and a mixer power calculation map; and (c) modifying a mixer temperature distribution of the segmented heated mixer by regulating power to the heated mixer segments based on at least one reductant UI in order to improve at least one reductant UI and/or improve the NOx reduction efficiency and to achieve a target efficiency.

In some embodiments, the operating parameters include at least one parameter type selected from the group consisting of: an injected UWS mass, an injector frequency, an injector duty cycle, an injection pump pressure, an exhaust gas flow rate, a NOx concentration downstream of the SCR catalyst, a NOx concentration upstream of the UWS injector, an exhaust gas temperature upstream of the UWS injector, an exhaust gas temperature downstream of the UWS injector, a mixer segment temperature, a mixer temperature distribution, a stored ammonia mass in the SCR catalyst, a stored ammonia distribution in the SCR catalyst, a stored NOx mass in the SCR catalyst, a stored NOx distribution in the SCR catalyst, a stored sulfur mass in the SCR catalyst, a stored sulfur distribution in the SCR catalyst, a stored hydrocarbon mass in the SCR catalyst, a stored hydrocarbon distribution in the SCR catalyst, a stored water mass in the SCR catalyst, a stored water distribution in the SCR catalyst, an Exhaust Gas Recirculation (EGR) percentile setting, cylinder deactivation setting, an engine load, and an engine speed.

In some embodiments, a plurality of the reductant UIs forms a basis for at least one UI state, and wherein at least one UI state is indicative of a relative NOx reduction efficiency.

In some embodiments, at least one reductant UI is evaluated for at least one specific location in the exhaust system, and wherein at least one specific location includes a catalyst location upstream of the SCR catalyst and/or a mixer location upstream of the segmented heated mixer.

In some embodiments, the step of modifying includes at least one parameter change selected from the group consisting of: changing an injected UWS mass, changing an injector frequency, changing an injector duty cycle, changing an injection pump pressure, and changing an Exhaust Gas Recirculation (EGR) percentile setting.

In some embodiments, the method further includes the step of: (d) validating at least one reductant UI and/or the mixer power calculation map based on the operating parameters of the exhaust system.

In some embodiments, the method further includes the step of: (d) detecting at least one potential improvement of at least one UI and/or the NOx reduction efficiency based on an increased ammonia mass in the exhaust system.

In some embodiments, the method further includes the step of: (d) prior to the step of determining, removing urea crystal deposits by regulating power to the heated mixer segments prior to any UWS injection in the exhaust system.

In some embodiments, the method further includes the step of: (d) prior to the step of determining, priming the segmented heated mixer by instructing the UWS injector to inject UWS onto the segmented heated mixer.

In some embodiments, the method further includes the steps of: (d) prior to the step of determining, increasing power to any combination, or the plurality, of the heated mixer segments prior to any UWS injection in the exhaust system; (e) prior to the step of determining, measuring an increased ammonia mass in the exhaust system; and (f) prior to the step of determining, identifying a urea crystal blockage of the exhaust system based on: (i) observing a higher exhaust gas pressure than under normal operating conditions of the exhaust system; and (ii) the increased ammonia mass in the exhaust system.

In embodiments, at least one of the elements of the mixer is preferably heated to a temperature best suited to raise the droplet temperature while avoiding Leidenfrost behavior imposed on the droplet. For urea water solutions typically utilized in the art, the desired mixer temp is greater than about 170° C., preferably from about 170° C. to about 220° C.

To assure therefore the resulting mixer temperature does not markedly fall below or above this desired temperature range, in an embodiment a feedback communication between the mixer and the controller is utilized, e.g., via a thermocouple installed on the mixer. In some embodiments, the controller is configured to direct a modulated power input, i.e., turning the power to the mixer on-and-off successively at a particular frequency, thus maintaining the mixer temperature in the desired range.

In other embodiments, the exhaust gas mixer and associated exhaust gas mixer system is configured, operated and/or utilized to improve fuel efficiency of internal combustion engines in general, and with diesel engines in particular. As is readily understood to one of skill in the art, the less excess fuel combusted in each cylinder of an engine the better the fuel economy of that engine. When an engine is operated under so-called "lean" conditions, more power is generated along with a reduction in particulates and the like. However, as is also known, the concentration of NOx in the exhaust increases dramatically. Under low exhaust gas temperatures, systems and mixers known in the art cannot produce an amount of ammonia or other reductant which allows for such lean engine conditions while still complying with regulatory requirements. Applicant has discovered, however, that when the instant heated segmented mixer is utilized, it is possible to produce a sufficient amount of reductant to treat the NOx rich exhaust as required by regulatory standards, without having to incur the substantial energy penalty that would be required by, for example, attempting to heat the entire exhaust stream above 250° C., or the like.

In one embodiment, the mixer is configured, operated and/or utilized in a fuel saving mode by producing an amount of reductant necessary to treat the amount of NOx produced by an engine operated under lean conditions when the exhaust gas temperature is below about 220° C. In such an embodiment, the heated segmented exhaust gas mixer is capable of generating an amount of ammonia and/or an ammonia precursor suitable to remove a NOx level of greater than or equal to about 3 g NOx/bhp-hr, preferably greater than or equal to about 5 g NOx/bhp-hr at an exhaust gas temperature below about 220° C., preferably below about 200° C., preferably below about 170° C., or below about 150° C., or 140° C., or 130° C., or 120° C., or 110° C. Likewise, the heated segmented exhaust gas mixer is capable of generating an amount of ammonia and/or an ammonia precursor suitable to remove a NOx level of greater than or equal to about 300 mg NOx/mile, preferably greater than or equal to about 500 mg NOx/mile, or greater than or equal to about 700 mg NOx/mile at an exhaust gas temperature below about 220° C., preferably below about 200° C., preferably below about 170° C., or below about 150° C., or 140° C., or 130° C., or 120° C., or 110° C.

In a related embodiment, the mixer is configured, operated and/or utilized in a fuel saving mode by producing an amount of reductant necessary to treat the amount of NOx produced by cold-start fuel injection. As is known in the art, during engine cold-start, or in general during cold engine operations (such as idling or low-idle), engine controllers inject additional fuel mainly to make/keep the aftertreatment system warmer/warm, including the SCR catalyst. This process is known as cold-start fuel injection. Applicants have discovered that the mixer may be configured, operated and/or utilized in a fuel saving mode by producing an amount of reductant necessary to treat the amount of NOx produced during cold-start fuel injection conditions when the exhaust gas is well below 150° C. In fact, fuel savings of greater than 5%, or 7% or higher were achieved.

In a related embodiment, the mixer is configured, operated and/or utilized in a fuel saving mode by producing an amount of reductant necessary to treat the amount of NOx produced during cold start conditions, thus reducing and/or eliminating the need for so-called "rapid heat up" control schemes common in the art. For example, the mixer is configured, operated and/or utilized in a fuel saving mode by producing an amount of reductant necessary to treat the amount of NOx produced during cold start conditions or in general during cold engine operations (such as idling or low-idle), such that various rapid heat up programs comprising excessive EGR recirculation, and/or direct catalyst heating can be eliminated.

In a related embodiment, the mixer is configured, operated and/or utilized in a fuel saving mode by producing an amount of reductant necessary to treat the amount of NOx produced by a lean-burning engine, and thus reduce the fuel consumption and efficiency loss that results from the formation of, and removal of particulate matter associated with a more fuel rich operation.

As is known in the art, under fuel rich operation, the amount of NOx decreases yet the amount of particulate matter in the exhaust increases. Particulate matter filters are known to substantially increase backpressure, thus resulting in a loss of efficiency. In addition, the ability of the instant heated segmented exhaust mixer to produce an amount of reductant necessary to treat the amount of NOx produced by a lean-burning engine with the corresponding reduction in particulate formation, further allows for a smaller diesel particulate filter to be employed, thus reducing the overall cost of the system due to the relatively high cost of the catalysts and other components required by the DPF. In addition, the lower formation of particulate matter results in a decrease in the need, i.e., frequency, and thus the energy penalty for regeneration of the DPF, amounting to additional improvement in fuel economy.

Accordingly, in an embodiment, the mixer is configured, operated and/or utilized in a fuel saving mode by producing an amount of reductant necessary to treat the amount of NOx produced by an engine operated under lean conditions when the exhaust gas temperature is below about 220° C., wherein the heated segmented exhaust gas mixer is capable of generating an amount of ammonia and/or an ammonia precursor suitable to remove a NOx level of greater than or equal to about 5 g NOx/bhp-hr, and/or in an amount greater than or equal to about 500 mg NOx/mile at an exhaust gas temperature below about 220° C., preferably below about 200° C., or below about 150° C.)

In still other embodiments, the mixer is configured, operated and/or utilized in an ammonia storage mode wherein the SCR catalyst is at a temperature well below 200° C. for a prolonged durations. As is well understood in the art, under engine cold start conditions, NOx may be treated by the SCR utilizing ammonia or other reductant stored in the SCR catalyst from a previous drive cycle. This stored ammonia helps with initial NOx reduction in the SCR catalyst during the next cold start, as low temperature DEF injection would not be available. In embodiments, the mixer is configured, operated and/or utilized in an ammonia storage mode by producing ammonia at temperatures well below the 200° C. temperatures often required by control systems before DEF injection is implemented. Accordingly, the use of the instant heated segmented exhaust gas mixer at temperatures well below 200 C allows for the formation of suitable amounts of ammonia such that the SCR catalyst no longer relies on previously stored ammonia for operation. As a result, applicant has discovered that utilizing embodiments of the mixer disclosed herein configured, operated and/or utilized in an ammonia storage mode results in over 80% SCR efficiency at 160° C. and 98% at 180° C., indicating further improvements are available.

In addition, applicant has discovered that embodiments of the heated segmented mixer further avoid and/or eliminate the formation of urea deposits and/or the operation of the mixer may be conducted to thaw (remove) urea deposits. Applicant discovered that operation of embodiments of the heated segmented mixer with DEF injection for 30 to 60 minutes under standard test conditions at an exhaust gas temperature of 150° C. did not result in the formation of urea deposits. Accordingly, in an embodiment, the mixer is configured, operated and/or utilized in a deposit mitigation and/or elimination mode at exhaust gas temperatures below about 200° C., preferably below about 180° C. or below about 150° C.

EMBODIMENTS LISTING

Consistent with the above disclosure, one or more embodiments include:

E1. An exhaust gas mixer, comprising a plurality of elements, at least one element independently heatable by an external power source to a temperature above a temperature of another element.

E2. The exhaust gas mixer of embodiment E1, wherein the at least one heatable element is heated using electrical resistance, microwave, mechanical, radiative, magnetic field inductive heating, induction coil heating, heated fluid circuit, piezoelectric heating, magnetic field-generated/induction coil heating, radiant heating, or a combination thereof.

E3. The exhaust gas mixer of any one of embodiments E1 or E2, wherein the at least one heatable element is heated using electrical resistance heating by passing an electric current therethrough.

E4. The exhaust gas mixer of any one of embodiments E1 through E3, wherein two or more, preferably each of the elements are independently heatable.

E5. The exhaust gas mixer of any one of embodiments E1 through E4, wherein the plurality of heatable elements are arranged along a cartesian grid, a polar grid, a spherical grid, a toroidal grid, in a ladder type arrangement, or a combinations thereof.

E6. The exhaust gas mixer of any one of embodiments E1 through E5, comprising a plurality of arrays, arrangements, rows, groups, or a combination thereof, of mixing elements disposed at an angle and/or essentially parallel to a fluid flow path through the mixer.

E7. The exhaust gas mixer of any one of embodiments E1 through E6, wherein a side of at least one of the plurality of heatable elements is oriented normal to a fluid flow path through the mixer, at an angle to a fluid flow path through the mixer, or a combination thereof.

E8. The exhaust gas mixer of any one of embodiments E1 through E7, comprising a turbine shaped element dimensioned and arranged to disrupt flow of a fluid flowing through the mixer.

E9. The exhaust gas mixer of any one of embodiments E1 through E8, wherein at least a portion of one or more of the plurality of heatable elements comprises one or more coating layers disposed on a substrate, preferably an electrically conductive substrate, preferably a metal substrate.

E10. The exhaust gas mixer of embodiment E9, wherein the one or more coating layers comprises a catalytically active material, preferably a catalytically active material suitable to produce ammonia and/or an ammonia precursor from urea, preferably comprising $TiO_2$.

E11. The exhaust gas mixer of embodiment E10, wherein at least a portion of the one or more heatable elements comprises an insulating material which reduces heat transfer between the portion of the element comprising the insulating material and a fluid flowing through the mixer.

E12. The exhaust gas mixer of any one of embodiments E1 through E11, wherein at least a portion of the at least one heatable element comprises a hydrophobic surface.

E13. The exhaust gas mixer of any one of embodiments E1 through E12, wherein at least a portion of the at least one heatable elements comprise a hydrophilic surface.

E14. The exhaust gas mixer of any one of embodiments E1 through E13, wherein a first portion of at least one heatable element comprises a hydrophobic surface and another portion of the at least one heatable element comprises a hydrophilic surface.

E15. The exhaust gas mixer of any one of embodiments E1 through E14, wherein a surface of one or more of the elements comprises a morphology which facilitates secondary atomization of droplets contacting the element.

E16. The exhaust gas mixer of any one of embodiments E1 through E15, wherein a surface of the at least one heatable element comprises a morphology which facilitates retention of droplets of an aqueous urea solution impacting the element for a period of time sufficient to produce ammonia and/or an ammonia precursor from the aqueous urea solution.

E17. The exhaust gas mixer of any one of embodiments E1 through E16, wherein a surface of the at least one heatable element comprises a roughened morphology, a stippled morphology, a porous morphology, or a combination thereof.

E18. The exhaust gas mixer of any one of embodiments E1 through E17, wherein at least a portion of a surface of one or more of the elements comprises an RMS roughness of less than or equal to about 50 microns.

E19. The exhaust gas mixer of any one of embodiments E1 through E18, wherein at least a portion of a surface of one or more of the elements comprises an RMS roughness of greater than or equal to about 50 microns.

E20. The exhaust gas mixer of any one of embodiments E1 through E19, wherein the at least one heatable element comprises a first portion having a first electrical resistance; and a second portion having a second electrical resistance which is different than the first electrical resistance, such that when an electric current flows through the element the first portion is heated to a higher temperature than the second portion of the element.

E21. The exhaust gas mixer of any one of embodiments E1 through E20, wherein at least one heatable element comprises a first portion having a thickness and/or cross section in the direction of the electrical current which is different than a thickness and/or cross section in the direction of the electrical current of a second portion of the heatable element, such that when an electric current flows through the element the first portion is heated to a higher temperature than the second portion of the element.

E22. The exhaust gas mixer of any one of embodiments E1 through E21, wherein at least one heatable element comprises a first portion comprising a first composition having a first electrical resistance, and a second portion comprising a second composition having a second electrical resistance; such that when an electric current flows through the element the first portion is heated to a different temperature than the second portion of the element.

E23. The exhaust gas mixer of any one of embodiments E1 through E22, wherein at least one heatable element comprises a saw-tooth profile disposed along a surface and/or an edge of the element.

E24. The exhaust gas mixer of any one of embodiments E1 through E23, wherein one or more of the elements comprise one or more nozzles, flow diverters, fins, appendages, holes, cross sectional profiles, bends, twists, or a combination thereof, which facilitate formation of ammonia and/or an ammonia precursor from an aqueous urea solution injected into an exhaust gas flowing through the mixer.

E25. The exhaust gas mixer of any one of embodiments E1 through E24, comprising a plurality of heatable elements, wherein two or more of the heatable elements are in parallel electrical communication with respect to each other and the external power source.

E26. The exhaust gas mixer of any one of embodiments E1 through E25, comprising a plurality of heatable elements, wherein two or more of the heatable elements are in serial electrical communication with respect to each other and the external power source.

E27. The exhaust gas mixer of any one of embodiments E1 through E26, wherein the at least one heatable element comprises a metallic foam, a 3D-printed structure, and additive manufacture structure, or a combination thereof.

E28. The exhaust gas mixer of any one of embodiments E1 through E27, wherein the at least one heatable element is heated to produce an increased reductant concentration and/or an increased reductant uniformity at an entrance of an SCR catalyst, relative to a comparative exhaust gas mixer which does not comprise a plurality of elements including at least one heatable element.

E29. An exhaust gas mixer, comprising a plurality of elements disposed within a flowpath located between a mixer inlet through which an exhaust gas and a reductant flow into the exhaust gas mixer, and a mixer outlet through which the exhaust gas and the reductant flow out of the exhaust gas mixer, at least one of the elements being heatable by an external power source independent of another of the plurality of elements.

E30. The exhaust gas mixer of embodiment E29, wherein each of the plurality of elements are independently heatable by the external power source.

E31. The exhaust gas mixer of embodiment E29 or E30, wherein at least one of the elements is heated using electrical resistance, microwave radiation, radiative heating, magnetic field inductive heating, thermal communication with an external heat source, piezoelectric heating, or a combination thereof.

E32. The exhaust gas mixer of any one of embodiments E29 through E31, wherein at least one of the elements is independently configured for resistance heating wherein an amount of electric current is directed through the element sufficient to increase the temperature of the element, independent of another element.

E33. The exhaust gas mixer of any one of embodiments E29 through E32, wherein at least one element is dimensioned and arranged within the flowpath to disrupt a flow of the exhaust gas and the reductant flowing through the mixer.

E34. The exhaust gas mixer of embodiment E33, wherein one or more of the elements comprise one or more nozzles, flow diverters, fins, appendages, holes, cross sectional profiles, bends, twists, or a combination thereof.

E35. The exhaust gas mixer of any one of embodiments E29 through E34, wherein the plurality of elements are arranged within the flowpath along a cartesian grid, a polar grid, a spherical grid, a toroidal grid, in a ladder type arrangement, in a plurality of arrays, rows, groups, or a combination thereof E36. The exhaust gas mixer of any one of embodiments E29 through E35, wherein the plurality of elements are arranged within the flowpath such that no linear flowpath from the mixer inlet to the mixer outlet exists.

E37. The exhaust gas mixer of any one of embodiments E29 through E37, wherein at least a portion of at least one element comprises:
i) one or more coating layers disposed on an electrically conductive substrate comprising a catalytically active material suitable to produce ammonia and/or an ammonia precursor from urea;
ii) a hydrophobic surface;

iii) a hydrophilic surface;
iv) a morphology which facilitates formation of reductant from droplets contacting the element;
v) or a combination thereof.

E38. The exhaust gas mixer of any one of embodiments E29 through E37, wherein at least a portion of a surface of at least one element comprises:
i) an RMS roughness of greater than or equal to about 50 microns;
ii) an RMS roughness of less than or equal to about 50 microns;
iii) a stippled morphology;
iv) a porous morphology;
v) a saw-tooth profile; or
vi) a combination thereof.

E39. The exhaust gas mixer of any one of embodiments E29 through E38, wherein at least one element comprises a first portion having a first electrical resistance; and a second portion having a second electrical resistance which is different than the first electrical resistance, such that when an electric current flows through the element the first portion is heated to a higher temperature than the second portion.

E40. The exhaust gas mixer of any one of embodiments E29 through E39, wherein at least one element comprises a main portion comprising the shortest electric flowpath between the power source and a ground such that the main portion is resistively heated to a first temperature when a sufficient amount of an electric current flows through the element, and one or more secondary portions which are arranged pendant to the main portion and which are resistively heated, if at all, to a second temperature below the first temperature when the same electric current flows through the element.

E41. The exhaust gas mixer of any one of embodiments E29 through E40, wherein at least one element comprises a plurality of zones, wherein at least one zone comprises a different metal or metal alloy relative to another of the zones, a metallic foam, a 3D-printed structure, an additive manufacture structure, or a combination thereof E42. An exhaust gas mixer system comprising an exhaust gas mixer according to any one of embodiments E1 through E41 in electronic communication with a controller configured to direct power from the external power source to the at least one heatable element to increase or decrease a temperature of the at least one heatable element independent of another element.

E43. The exhaust gas mixer system of embodiment E42, wherein the exhaust gas mixer comprises a plurality of heatable elements, each independently heatable by directing an electric current therethrough, wherein the controller is configured to direct power to a first heatable element independent of a second heatable element, by directing a first amount of electric current through the first heatable element which is greater than a second amount of electrical current, if any, directed through the second heatable element.

E44. The exhaust gas mixer system of embodiment E42 or E43, disposed within an exhaust gas conduit downstream of an exhaust gas source, and downstream of an aqueous urea injector (a UWS injector) and upstream of a selective catalytic reduction (SCR) catalyst, and further comprising one or more NOx sensors, wherein the controller is capable of heating one or more of the heatable elements to optimize SCR catalytic reduction of NOx to nitrogen downstream of the SCR catalyst.

E45. The exhaust gas mixer system of any one of embodiments E42 through E44, wherein the controller is in electrical communication with, and capable of monitoring one or more sensor and/or control module inputs, and/or controlling one or more system components, and wherein the controller provides power to the one or more of the heatable elements based on one or more of sensor and/or control module inputs, and/or in unison with controlling one or more of components.

E46. The exhaust gas mixer system of any one of embodiments E42 through E45, wherein the one or more sensor and/or control module inputs, and/or the one or more system components include a UWS injector mass, a UWS injector frequency, a UWS injector duty cycle, a UWS injection pump pressure, an exhaust gas flow rate, a NOx concentration downstream of the SCR catalyst, a NOx concentration upstream of the UWS injector, an exhaust gas temperature upstream of the UWS injector, an exhaust gas temperature downstream of the UWS injector, a mixer segment temperature, a mixer temperature distribution, a stored ammonia mass in the SCR catalyst, a stored ammonia distribution in the SCR catalyst, a stored NOx mass in the SCR catalyst, a stored NOx distribution in the SCR catalyst, a stored sulfur mass in the SCR catalyst, a stored sulfur distribution in the SCR catalyst, a stored hydrocarbon mass in the SCR catalyst, a stored hydrocarbon distribution in the SCR catalyst, a stored water mass in the SCR catalyst, a stored water distribution in the SCR catalyst, an Exhaust Gas Recirculation (EGR) percentile setting, cylinder deactivation setting, a fuel injector timing, a fuel injector mass, an engine load, an elevation, a UWS integrity sensor, an engine speed, or a combination thereof.

E47. The exhaust gas mixer system of any one of embodiments E42 through E46, wherein the controller is capable of determining a temperature of one or more heatable elements using an algorithm, machine learning, a neural network, artificial intelligence, a model, a calculation of prediction mechanism, one or more lookup tables, a current or resistance measurement, a temperature thermocouple in thermal communication with a particular heatable element and/or with the exhaust gas, a thermal camera, or a combination thereof.

E48. The exhaust gas mixer system of any one of embodiments E42 through E49, wherein the controller is capable of determining the existence of a deposit and/or fouling, preferably comprising urea, formed on one or more of the elements and controlling heating of one of more heated elements to remove the deposit.

E49. The exhaust gas mixer system of any one of embodiments E42 through E48, wherein the system is capable of generating an amount of ammonia and/or an ammonia precursor suitable to remove a NOx level of about 1 to 3 g NOx/bhp-hr, or from about 3 to 5 g NOx/bhp-hr, or greater than or equal to about 5 g NOx/bhp-hr, or greater than or equal to about 7 g NOx/bhp-hr at an exhaust gas temperature below 200° C.

E50. The exhaust gas mixer system of any one of embodiments E42 through E49, wherein the controller is capable of heating any one or more selected group of heatable elements in any order desired by the controller algorithm in which the selected heatable element or selected group of heatable elements is heated over a suitable period of time, heated in one or more heating sequences over a suitable period of time, is heated to a fixed temperature for a suitable period of time, is heated to variable temperatures in one or more elements, or a combination thereof, such that the heating of the heatable elements by the controller increase a reductant concentration, a reductant uniformity, or both, at the SCR entrance, as determined by an increased SCR efficiency relative to a comparative system lacking the heatable elements and the controller.

E51. An exhaust gas system for treating an exhaust gas from an exhaust gas source, comprising:
  i) an exhaust gas mixer according to any one of embodiments E1 through E41 disposed within a conduit downstream of a urea water solution (UWS) injector system, and upstream of a selective catalytic reduction (SCR) catalyst, an electronic controller configured to direct power to at least one element of the mixer, and in electronic communication one or more sensors and/or control modules;
  ii) the exhaust gas mixer comprising a plurality of elements disposed within a flowpath located between a mixer inlet through which the exhaust gas and a reductant flow into the exhaust gas mixer, and a mixer outlet through which the exhaust gas and the reductant flow out of the exhaust gas mixer, at least one of the elements being heatable by an external power source independent of another of the plurality of elements;
  iii) wherein the controller is configured to increase or decrease a temperature of the one or more elements independent of the other elements to optimize SCR catalytic reduction of NOx present in the exhaust gas flowing therethrough to nitrogen and water downstream of the SCR catalyst, based on one or more inputs from the one or more sensors and/or control modules.

E52. An exhaust gas system for treating an exhaust gas from an exhaust gas source, comprising:
  i) an exhaust gas mixer disposed within a conduit downstream of a urea water solution (UWS) injector system, and upstream of a selective catalytic reduction (SCR) catalyst, an electronic controller configured to direct power to at least one element of the mixer, and in electronic communication one or more sensors and/or control modules;
  ii) the exhaust gas mixer comprising a plurality of elements disposed within a flowpath located between a mixer inlet through which the exhaust gas and a reductant flow into the exhaust gas mixer, and a mixer outlet through which the exhaust gas and the reductant flow out of the exhaust gas mixer, at least one of, preferably at least two of the elements being heatable by an external power source independent of another of the plurality of elements;
  iii) wherein the controller is configured to increase or decrease a temperature of the one or more elements independent of the other elements to optimize SCR catalytic reduction of NOx present in the exhaust gas flowing therethrough to nitrogen and water downstream of the SCR catalyst, based on one or more inputs from the one or more sensors and/or control modules.

E53. The exhaust gas system of any one of embodiments E51 or E52, further comprising one or more control modules, and/or one or more system components, each in electronic communication with the controller, wherein the controller is configured to monitor inputs from one or more sensors, one or more control modules, and/or to control one or more system components, and wherein the controller directs power to one or more of the elements based on one or more sensor and/or control module inputs, and/or in unison with controlling one or more system components.

E54. The exhaust gas system of any one of embodiments E51 through E53, wherein the one or more sensor and/or control module inputs, and/or the one or more system component controls include: an urea water solution (UWS) injection mass, a UWS spray droplet size or size distribution, a UWS injector frequency, a UWS injector duty cycle, a UWS injection pump pressure, an exhaust gas flow rate sensor, a NOx concentration sensor downstream of the SCR catalyst, a NOx concentration sensor upstream of the UWS injector, a NOx concentration sensor between the mixer and the exit of the SCR catalyst, a measure of distribution uniformity of flow, reductant downstream of the mixer, an exhaust gas temperature sensor upstream of the UWS injector, an exhaust gas temperature sensor downstream of the UWS injector, a mixer segment temperature sensor, a thermal camera, a mixer temperature distribution, a stored ammonia mass in the SCR catalyst, a stored ammonia distribution in the SCR catalyst, a stored NOx mass in the SCR catalyst, a stored NOx distribution in the SCR catalyst, a stored sulfur mass in the SCR catalyst, a stored sulfur distribution in the SCR catalyst, a stored hydrocarbon mass in the SCR catalyst, a stored hydrocarbon distribution in the SCR catalyst, a stored water mass in the SCR catalyst, a stored water distribution in the SCR catalyst, an Exhaust Gas Recirculation (EGR) setting, a cylinder deactivation setting, a fuel injector timing, a fuel injection mass, an engine load, an elevation, an ambient temperature sensor, a UWS integrity sensor, an engine speed, a fuel composition sensor, or a combination thereof.

E55. The exhaust gas system of any one of embodiments E51 through E54, wherein the controller utilizes an algorithm, machine learning, a neural network, artificial intelligence, a model, a calculation of prediction mechanism, one or more lookup tables, or a combination thereof to select to which of the one or more of the elements to direct power from the external power source, to optimize SCR catalytic reduction of NOx present in the exhaust gas flowing therethrough.

E56. The exhaust gas system of any one of embodiments E51 through E55, wherein the system is capable of generating an amount of ammonia and/or an ammonia precursor suitable to remove a NOx level of greater than or equal to about 0.5 g NOx/bhp-hr, at an exhaust gas temperature below about 220° C.

E57. The exhaust gas system of any one of embodiments E51 through E56, wherein the controller is configured to direct an amount of power from the external power source to one or more of the elements to increase the temperature of the exhaust gas flowing therethrough in an amount sufficient to increase a temperature of at least a portion of the SCR catalyst.

E58. A method comprising:
  i) providing the system according to any one of embodiments E42 through E57, comprising the exhaust gas mixer according to any one of embodiments E1 through E41;

ii) directing a urea water solution and an exhaust gas comprising an amount of NOx from the exhaust gas source therethrough; and iii) controlling a direction of power from the external power source to at least one of the elements to independently increase or decrease a temperature of at least one element to optimize SCR catalytic reduction of NOx present in the exhaust gas flowing therethrough to nitrogen and water downstream of the SCR catalyst, based on one or more inputs from the one or more sensors and/or control modules.

E59. A method of using the exhaust gas mixer according to any one of embodiments E1 through E41, comprising directing power from the external power source to the at least one heatable element to increase a temperature of the at least one heatable element above a temperature of another element.

E60. The method of embodiment E58 or E59, wherein the at least one heatable element is heated to a temperature above a fluid in contact with the element flowing through the exhaust gas mixer.

E61. The method of any one of embodiments E58 through E60, wherein the heating comprises directing an electrical current through the at least one heatable element provided by the external power source.

E62. The method of any one of embodiments E58 through E61, wherein the exhaust gas mixer comprises a plurality of heatable elements, and wherein the method further comprises heating one or more heatable elements independently or simultaneously according to a temporal arrangement, a spatial arrangement, or a combination thereof.

E63. The method of any one of embodiments E58 through E62, wherein the system is capable of generating an amount of ammonia and/or an ammonia precursor suitable to remove a NOx level of greater than or equal to about 0.5 g NOx/bhp-hr at an exhaust gas temperature below about 220° C.

E64. The method of any one of embodiments E58 through E62, wherein the system is capable of generating an amount of ammonia and/or an ammonia precursor suitable to remove a NOx level of greater than or equal to about 3 g NOx/bhp-hr at an exhaust gas temperature below about 220° C.

E65. The method of any one of embodiments E58 through E62, wherein the system is capable of generating an amount of ammonia and/or an ammonia precursor suitable to remove a NOx level of greater than or equal to about 5 g NOx/bhp-hr at an exhaust gas temperature below about 220° C.

E66. The method of any one of embodiments E58 through E62, wherein the system is capable of generating an amount of ammonia and/or an ammonia precursor suitable to remove a NOx level of greater than or equal to about 7 g NOx/bhp-hr at an exhaust gas temperature below about 220° C.

E67. The method of any one of embodiments E58 through E65, wherein the system is capable of generating an amount of ammonia and/or an ammonia precursor suitable to remove a NOx level of greater than or equal to about 300 mg NOx/mile, at an exhaust gas temperature below about 220° C.

E68. The method of any one of embodiments E58 through E65, wherein the system is capable of generating an amount of ammonia and/or an ammonia precursor suitable to remove a NOx level of greater than or equal to about 400 mg NOx/mile, at an exhaust gas temperature below about 220° C.

E69. The method of any one of embodiments E58 through E65, wherein the system is capable of generating an amount of ammonia and/or an ammonia precursor suitable to remove a NOx level of greater than or equal to about 500 mg NOx/mile, at an exhaust gas temperature below about 220° C.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

We claim:

1. An exhaust gas mixer, comprising a plurality of elements configured to be disposed within a conduit downstream of a urea water solution injector within an exhaust gas flowpath, the plurality of elements located between a mixer inlet through which an exhaust gas and a reductant flow into the exhaust gas mixer, and a mixer outlet through which the exhaust gas and the reductant flow out of the exhaust gas mixer, at least one of the elements being heatable by an external power source independent of another of the plurality of elements, wherein the plurality of elements are arranged within the exhaust gas flowpath such that no line of sight exists between the mixer inlet and the mixer outlet.

2. The exhaust gas mixer of claim 1, wherein each of the plurality of elements are independently heatable by the external power source.

3. The exhaust gas mixer of claim 1, wherein at least one of the elements is heated using electrical resistance, microwave radiation, radiative heating, magnetic field inductive heating, thermal communication with an external heat source, piezoelectric heating, or a combination thereof.

4. The exhaust gas mixer of claim 1, wherein at least one of the elements is independently configured for resistance heating wherein an amount of electric current is directed through the element sufficient to increase a temperature of the element, independent of another element.

5. The exhaust gas mixer of claim 1, wherein one or more of the elements comprise one or more nozzles, flow diverters, fins, appendages, holes, cross sectional profiles, bends, twists, or a combination thereof.

6. The exhaust gas mixer of claim 1, wherein the plurality of elements are arranged within the flowpath along a cartesian grid, a polar grid, a spherical grid, a toroidal grid, in a ladder arrangement, in a plurality of arrays, rows, groups, or a combination thereof.

7. The exhaust gas mixer of claim 1, wherein at least one element comprises a first portion having a first electrical resistance; and a second portion having a second electrical resistance which is different than the first electrical resistance, such that when an electric current flows through the element, the first portion is heated to a higher temperature than the second portion.

8. The exhaust gas mixer of claim 1, wherein at least one element comprises a main portion comprising the shortest electric flowpath between the power source and a ground such that the main portion is resistively heated to a first temperature when a sufficient amount of an electric current flows through the element, and one or more secondary portions which are arranged pendant to the main portion and which are resistively heated to a second temperature below the first temperature when the same electric current flows through the element.

9. The exhaust gas mixer of claim 1, wherein at least one element comprises a plurality of zones, wherein at least one zone comprises a different metal or metal alloy relative to another of the zones, a metallic foam, a 3D-printed structure, an additive manufacture structure, or a combination thereof.

10. The exhaust gas mixer of claim 1, wherein at least a portion of at least one element comprises:
    i) one or more coating layers disposed on an electrically conductive substrate comprising a catalytically active material suitable to produce ammonia and/or an ammonia precursor from urea;
    ii) a hydrophobic surface;
    iii) a hydrophilic surface;
    iv) a morphology which facilitates formation of reductant from droplets contacting the element;
    v) or a combination thereof.

11. The exhaust gas mixer of claim 10, wherein at least a portion of a surface of at least one element comprises:
    i) an RMS roughness of greater than or equal to 50 microns;
    ii) an RMS roughness of less than or equal to 50 microns;
    iii) a stippled morphology;
    iv) a porous morphology;
    v) a saw-tooth profile; or
    vi) a combination thereof.

12. An exhaust gas system for treating an exhaust gas from an exhaust gas source, comprising:
    an exhaust gas mixer disposed within a conduit downstream of a urea water solution (UWS) injector system, and upstream of a selective catalytic reduction (SCR) catalyst, an electronic controller configured to direct power to at least one element of the mixer, and in electronic communication with one or more sensors and/or control modules;
    the exhaust gas mixer comprising a plurality of elements configured to be disposed within a conduit downstream of a urea water solution injector within an exhaust gas flowpath, the plurality of elements located between a mixer inlet through which an exhaust gas and a reductant flow into the exhaust gas mixer, and a mixer outlet through which the exhaust gas and the reductant flow out of the exhaust gas mixer, at least one of the elements being heatable by an external power source independent of another of the plurality of elements,
    wherein the plurality of elements are arranged within the exhaust gas flowpath such that no line of sight exists between the mixer inlet and the mixer outlet, and
    wherein the controller is configured to increase or decrease a temperature of the one or more elements independent of the other elements to optimize SCR catalytic reduction of NOx present in the exhaust gas flowing therethrough to nitrogen and water downstream of the SCR catalyst, based on one or more inputs from the one or more sensors and/or control modules.

13. The exhaust gas system of claim 12, wherein the controller utilizes an algorithm, machine learning, a neural network, artificial intelligence, a model, a calculation of prediction mechanism, one or more lookup tables, or a combination thereof to select to which of the one or more of the elements to direct power from the external power source, to optimize SCR catalytic reduction of NOx present in the exhaust gas flowing therethrough.

14. The exhaust gas system of claim 12, wherein the system is capable of generating an amount of ammonia and/or an ammonia precursor suitable to remove a NOx level of greater than or equal to 0.5 g NOx/bhp-hr, or greater than or equal to 300 mg NOx/mile, at an exhaust gas temperature below about 220° C.

15. The exhaust gas system of claim 12, wherein the controller is configured to direct an amount of power from the external power source to one or more of the elements to increase the temperature of the exhaust gas flowing therethrough in an amount sufficient to increase a temperature of at least a portion of the SCR catalyst.

16. The exhaust gas system of claim 12, further comprising one or more control modules, and/or one or more system components, each in electronic communication with the controller, wherein the controller is configured to monitor inputs from one or more sensors, one or more control modules, and/or to control one or more system components, and wherein the controller directs power to one or more of the elements based on one or more sensor and/or control module inputs, and/or in unison with controlling one or more system components.

17. The exhaust gas system of claim 16, wherein the one or more sensor and/or control module inputs, and/or the one or more system component controls include:
    an urea water solution (UWS) injection mass, a UWS spray droplet size or size distribution, a UWS injector frequency, a UWS injector duty cycle, a UWS injection pump pressure, an exhaust gas flow rate sensor, a NOx and/or ammonia concentration sensor downstream of the SCR catalyst, a NOx and/or ammonia concentration sensor upstream of the UWS injector, a NOx and/or ammonia concentration sensor between the mixer and an exit of the SCR catalyst, a measure of distribution uniformity of flow, reductant downstream of the mixer, an exhaust gas temperature sensor upstream of the UWS injector, an exhaust gas temperature sensor downstream of the UWS injector, a mixer segment temperature sensor, a thermal camera, a mixer temperature distribution, a stored ammonia mass in the SCR catalyst, a stored ammonia distribution in the SCR catalyst, a stored NOx mass in the SCR catalyst, a stored NOx distribution in the SCR catalyst, a stored sulfur mass in the SCR catalyst, a stored sulfur distribution in the SCR catalyst, a stored hydrocarbon mass in the SCR catalyst, a stored hydrocarbon distribution in the SCR catalyst, a stored water mass in the SCR catalyst, a stored water distribution in the SCR catalyst, an Exhaust Gas Recirculation (EGR) setting, a cylinder deactivation setting, a fuel injector timing, a fuel injection mass, an engine load, an elevation, an ambient temperature sensor, a UWS integrity sensor, an engine speed, a fuel composition sensor, or a combination thereof.

18. A method comprising:
i) directing an exhaust gas comprising an amount of NOx from an exhaust gas source through an exhaust gas system for treating the exhaust gas from an exhaust gas source of claim 14,
ii) directing a urea water solution into the exhaust gas stream upstream of the exhaust gas mixer; and
iii) controlling a direction of power from the external power source to at least one of the elements to independently increase or decrease a temperature of at least one element to optimize SCR catalytic reduction of NOx present in the exhaust gas flowing therethrough to nitrogen and water downstream of the SCR catalyst, based on one or more inputs from the one or more sensors and/or control modules.

* * * * *